United States Patent [19]

Sprong et al.

[11] Patent Number: 6,134,659
[45] Date of Patent: Oct. 17, 2000

[54] CONTROLLED USAGE SOFTWARE

[76] Inventors: Katherine A. Sprong; Donald J. Sprong, both of 2723 Singer Woods Dr., Abingdon, Md. 21009

[21] Appl. No.: 09/440,944

[22] Filed: Nov. 16, 1999

Related U.S. Application Data

[63] Continuation-in-part of application No. 09/004,143, Jan. 7, 1998.

[51] Int. Cl.[7] .................................................. G06F 11/30
[52] U.S. Cl. ......................... 713/190; 713/164; 713/165; 713/170; 713/200; 380/255; 705/51; 705/56; 705/57; 705/58; 705/67
[58] Field of Search ................................ 380/255, 282, 380/283; 705/50, 51, 54, 56, 57, 58, 59, 67, 72, 77; 713/164, 165, 166, 169, 187, 190, 193, 200

[56] References Cited

U.S. PATENT DOCUMENTS

| | | | |
|---|---|---|---|
| 4,658,093 | 4/1987 | Hellman | 380/25 |
| 4,688,169 | 8/1987 | Joshi | 364/200 |
| 4,888,798 | 12/1989 | Earnest | 380/4 |
| 5,199,066 | 3/1993 | Logan | 380/4 |
| 5,337,357 | 8/1994 | Chau et al. | 380/4 |
| 5,457,746 | 10/1995 | Dolphin | 380/4 |
| 5,490,216 | 2/1996 | Richardson | 380/4 |
| 5,509,071 | 4/1996 | Petroe et al. | 380/4 |
| 5,530,751 | 6/1996 | Morris | 380/4 |
| 5,541,991 | 7/1996 | Benson et al. | 380/4 |
| 5,568,552 | 10/1996 | Davis | 380/4 |
| 5,586,186 | 12/1996 | Yuval et al. | 380/30 |
| 5,615,061 | 3/1997 | Singh | 360/60 |
| 5,625,690 | 4/1997 | Michel et al. | 380/4 |
| 5,628,015 | 5/1997 | Singh | 395/186 |
| 5,649,187 | 7/1997 | Hornbuckle | 395/610 |
| 5,652,793 | 7/1997 | Priem et al. | 380/4 |
| 5,790,664 | 8/1998 | Coley et al. | 380/4 |

OTHER PUBLICATIONS

"Security Limited Program for Modifying Programs Strored on Disks", IBM Technical Disclosure Bulletin Jun. 1971 pp. 51–53, Apr. 1993.

*Primary Examiner*—Tod R. Swann
*Assistant Examiner*—Paul E. Callahan
*Attorney, Agent, or Firm*—Larry J. Guffey

[57] ABSTRACT

The present invention provides a new and novel system and method for protecting a computer software program from unauthorized use and/or copying. In a preferred embodiment of the invention, each embodiment of the storage medium containing the software also includes means for: (1) inhibiting use of the software unless a valid authorization code for use has been received from a remote authorization unit, (2) generating, storing and retrieving a serial number uniquely associated with the particular host computer on which the software is to be used, (3) inhibiting transfer from one host computer to another of the software unless a valid deauthorization code has been received from a remote authorization unit, (4) uniquely identifying each embodiment of the storage medium, thereby making it possible to individually track each embodiment of the storage medium and to recognize when such an embodiment may have been copied before its installation on a host computer or installed on multiple host computers, and (5) preventing hackers from inputting an unlimited number of authorization codes in an attempt to enable use of the software.

20 Claims, 28 Drawing Sheets

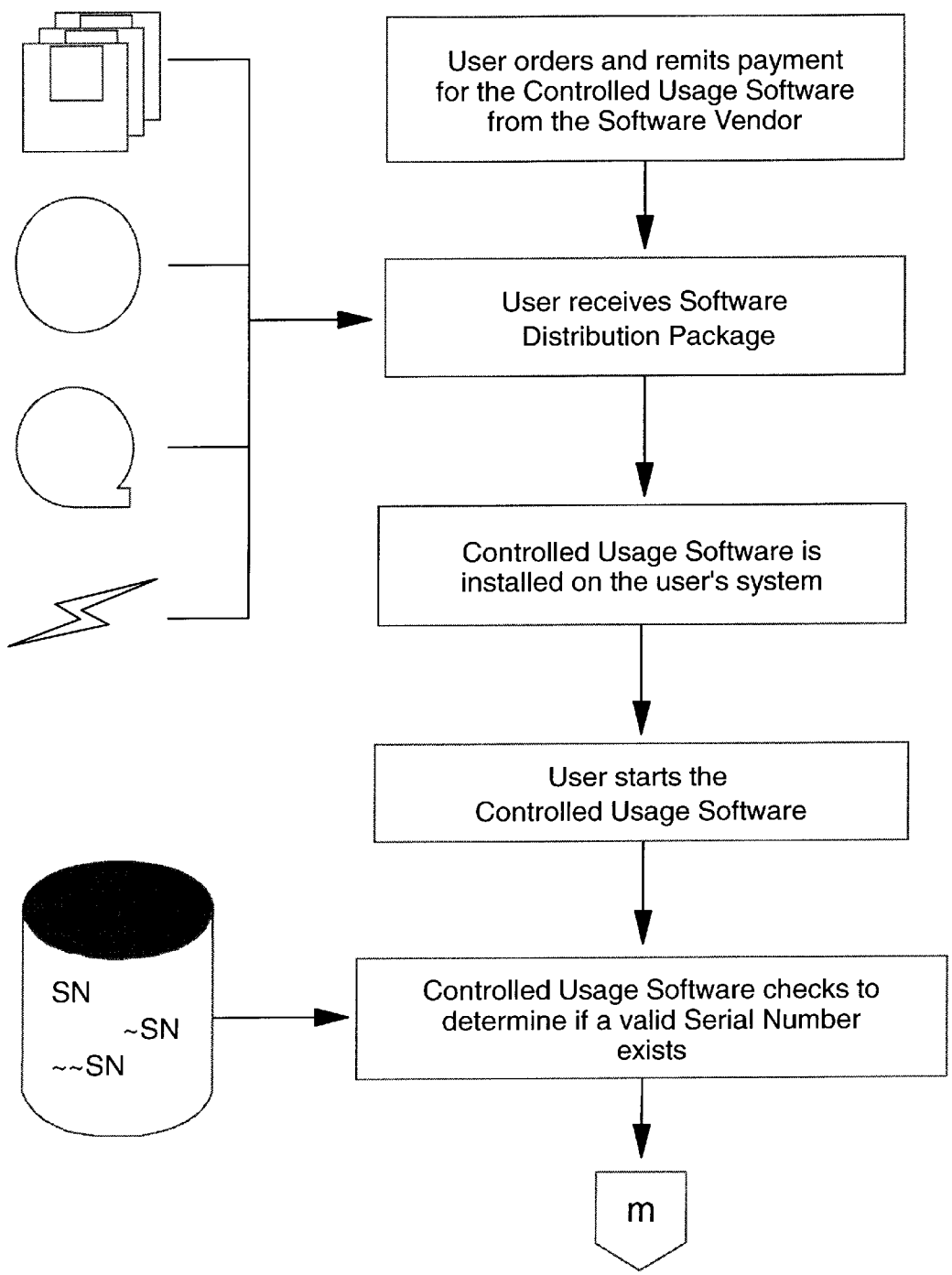
Figure 2-A

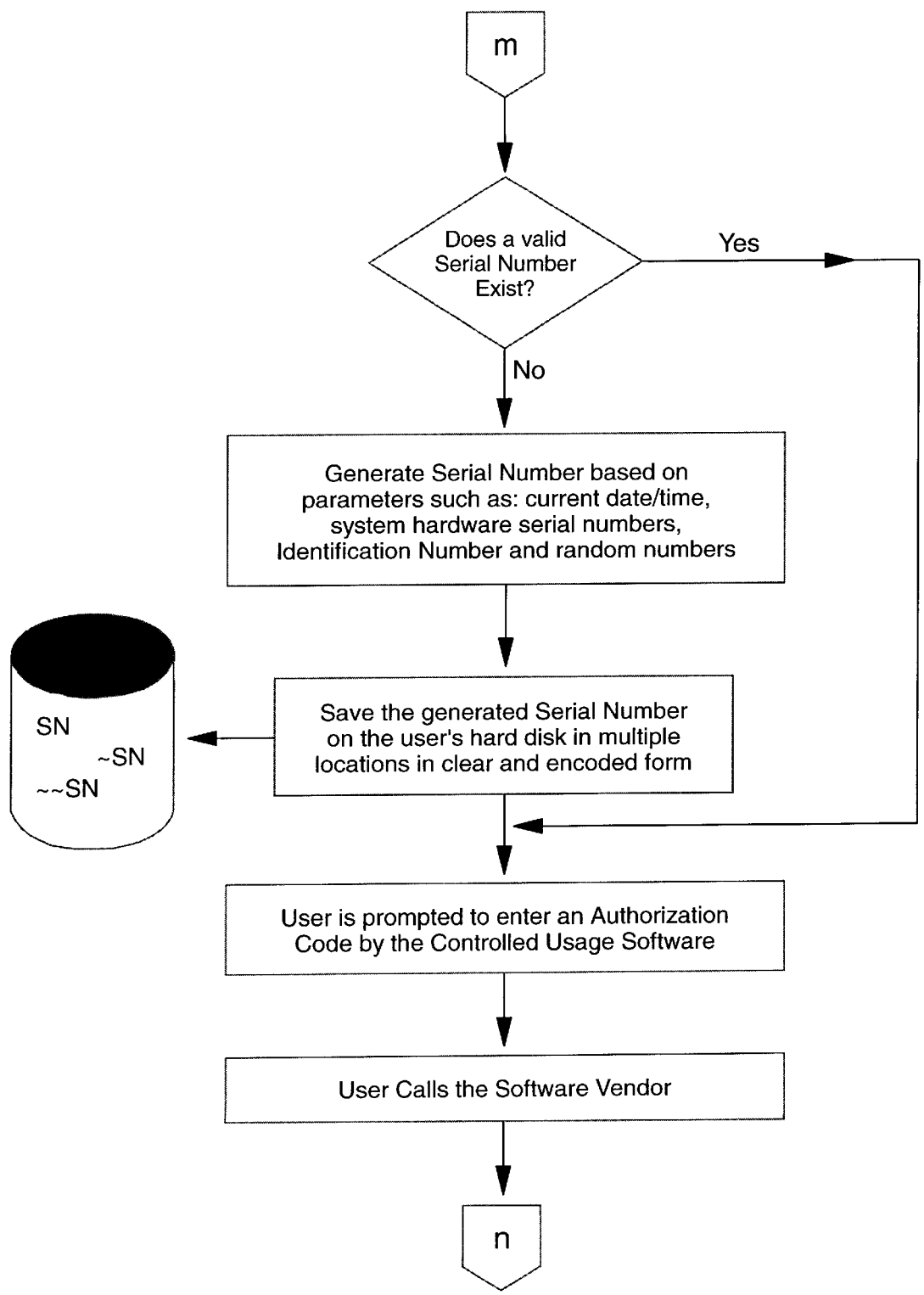
Figure 2-B

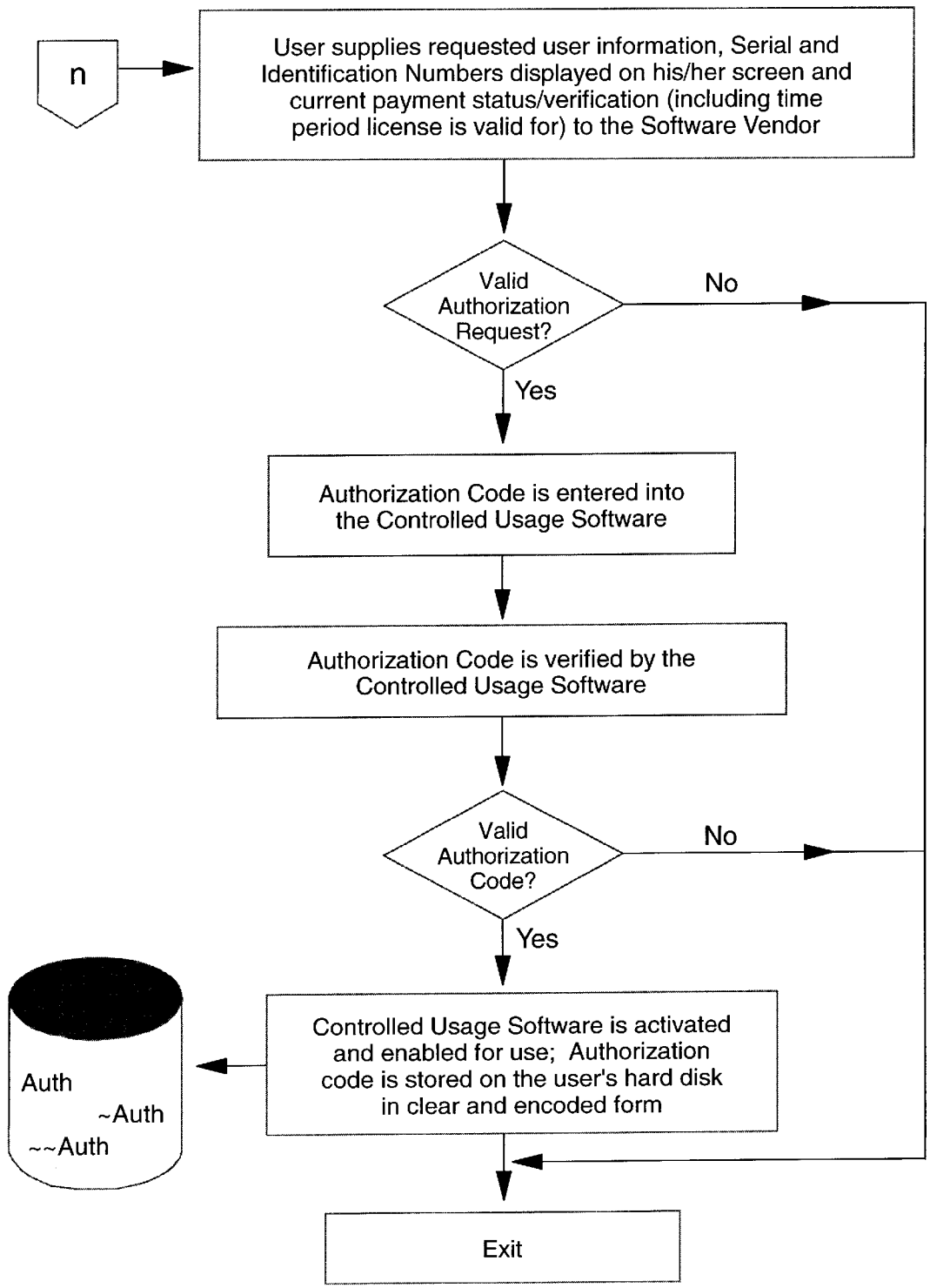
Figure 2-C

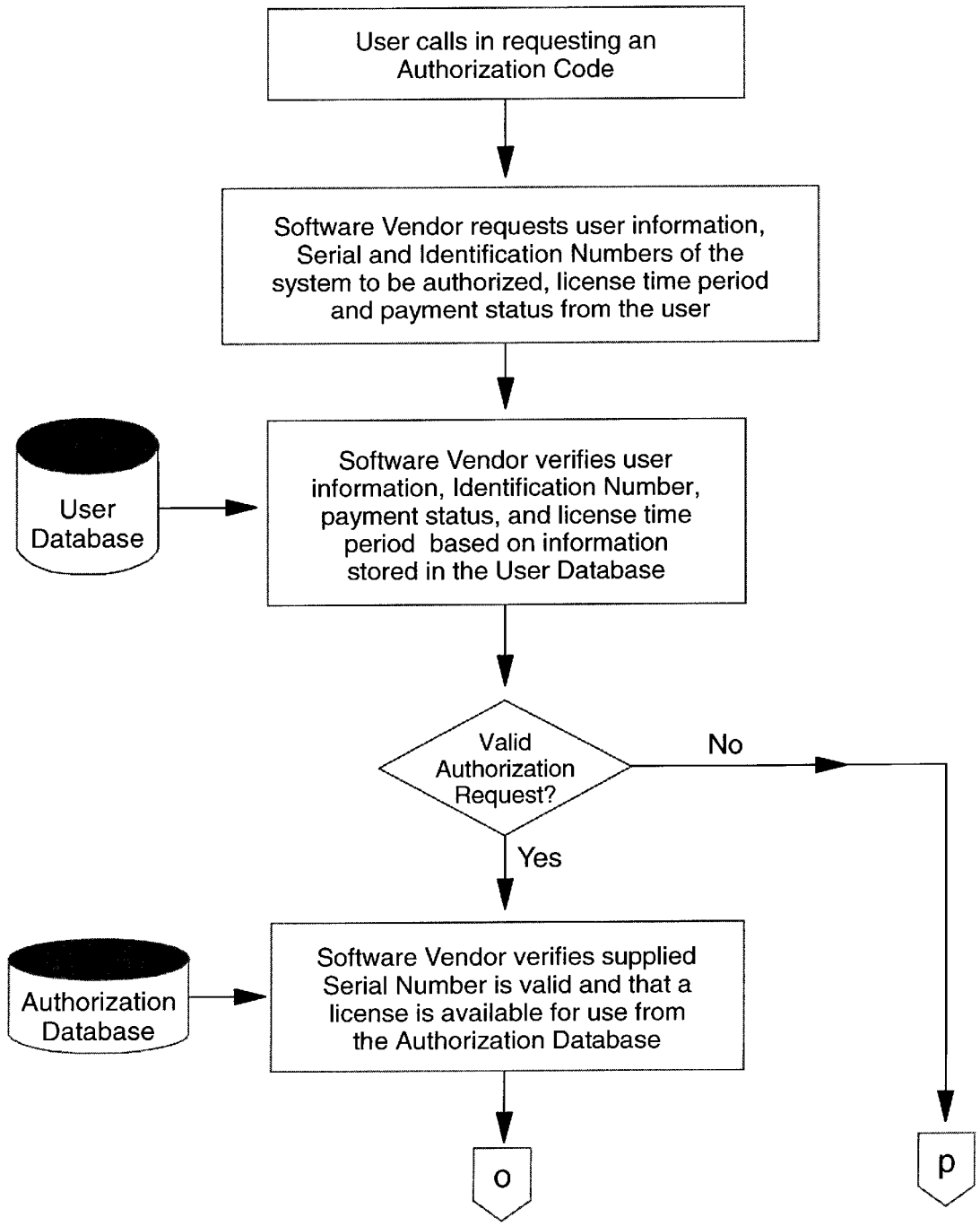
Figure 3-A

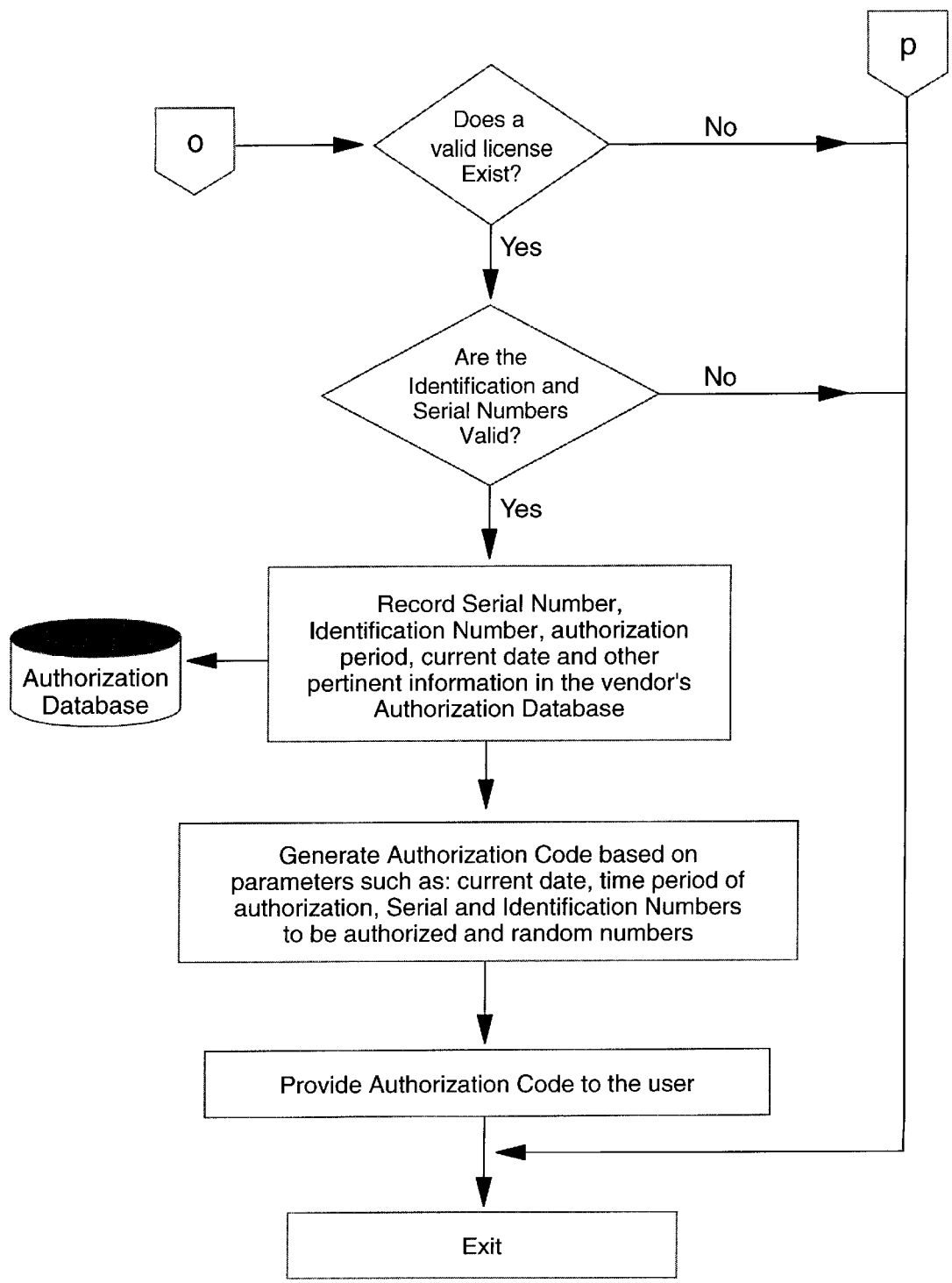
Figure 3-B

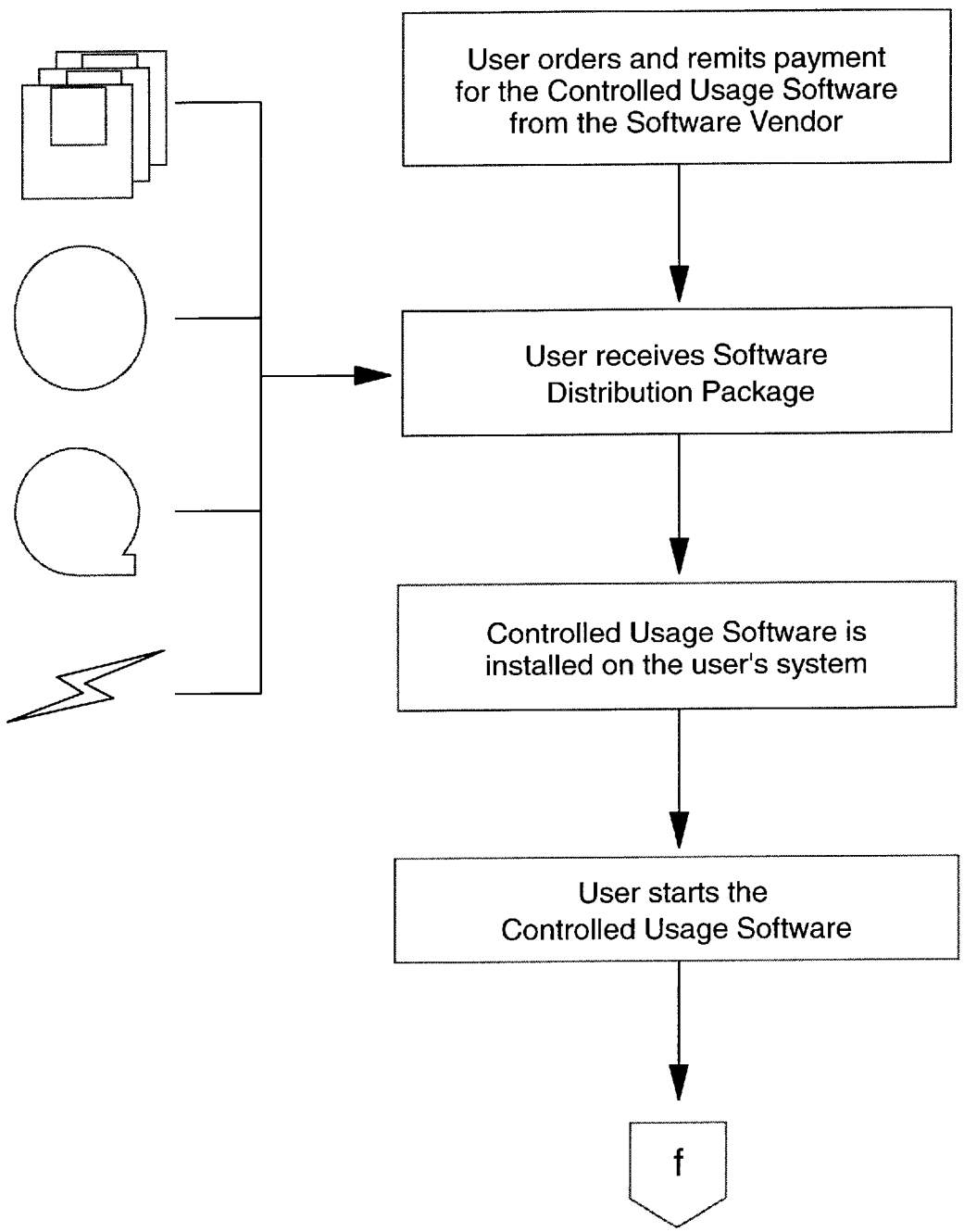
Figure 6-A

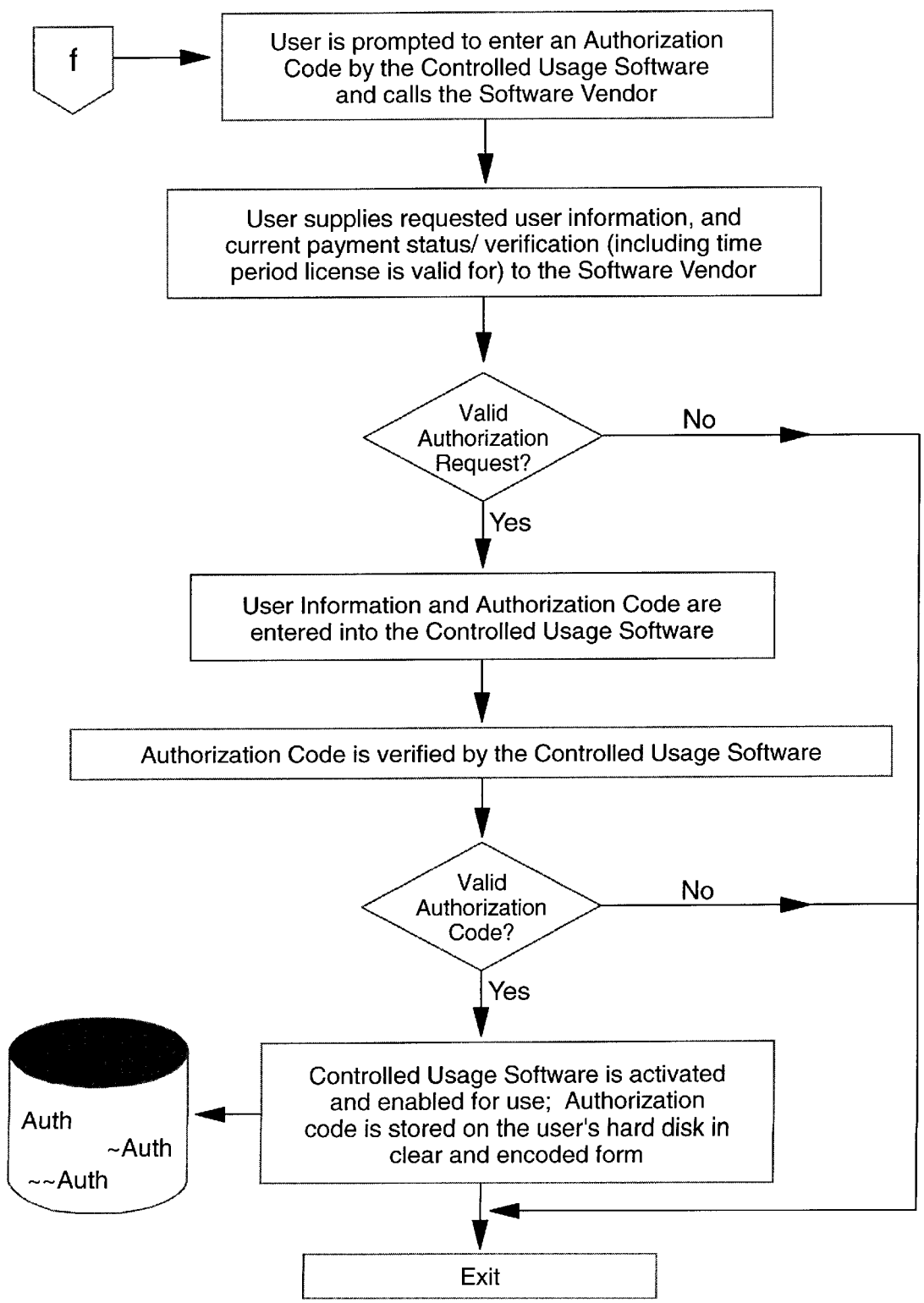
Figure 6-B

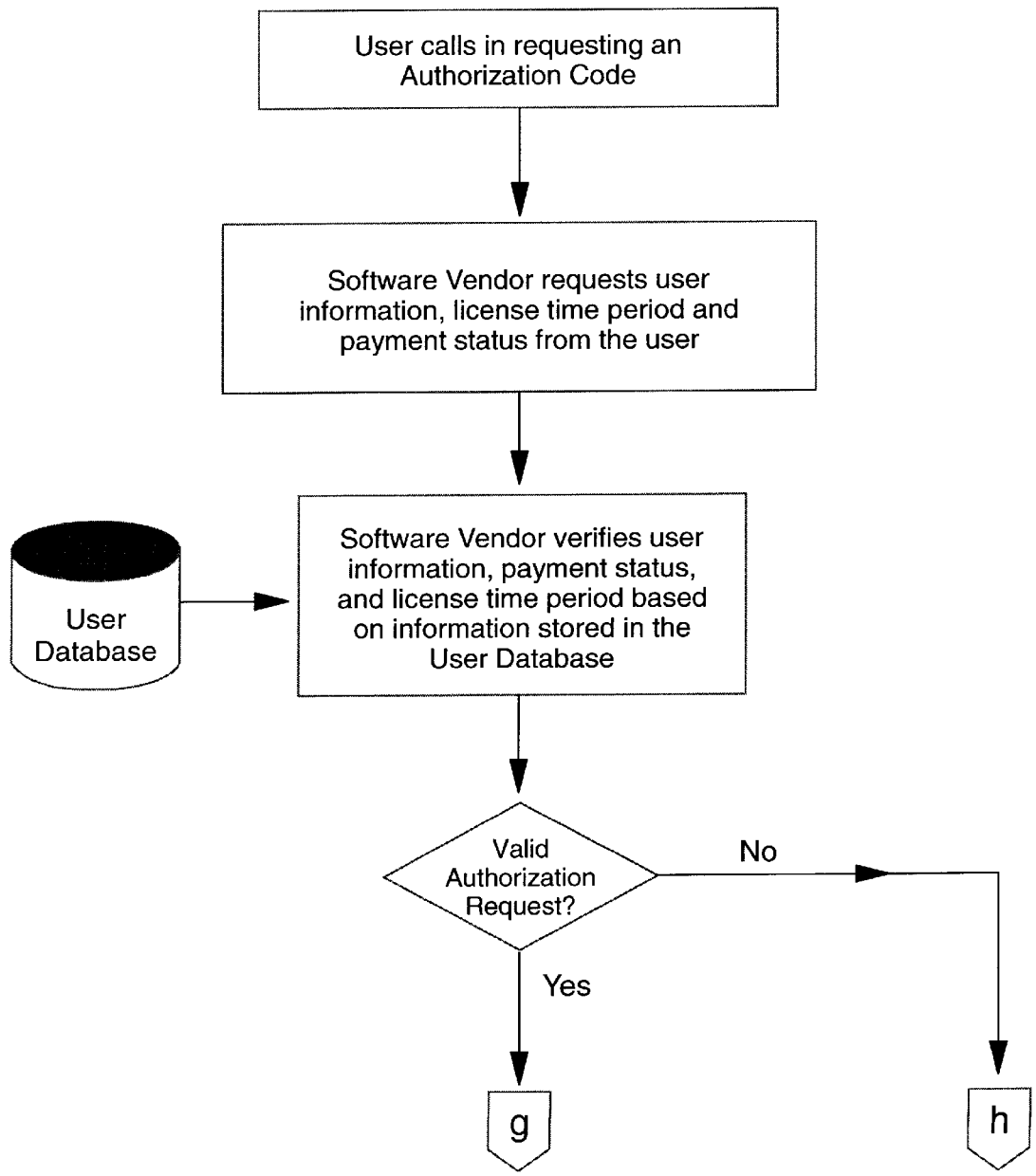
Figure 7-A

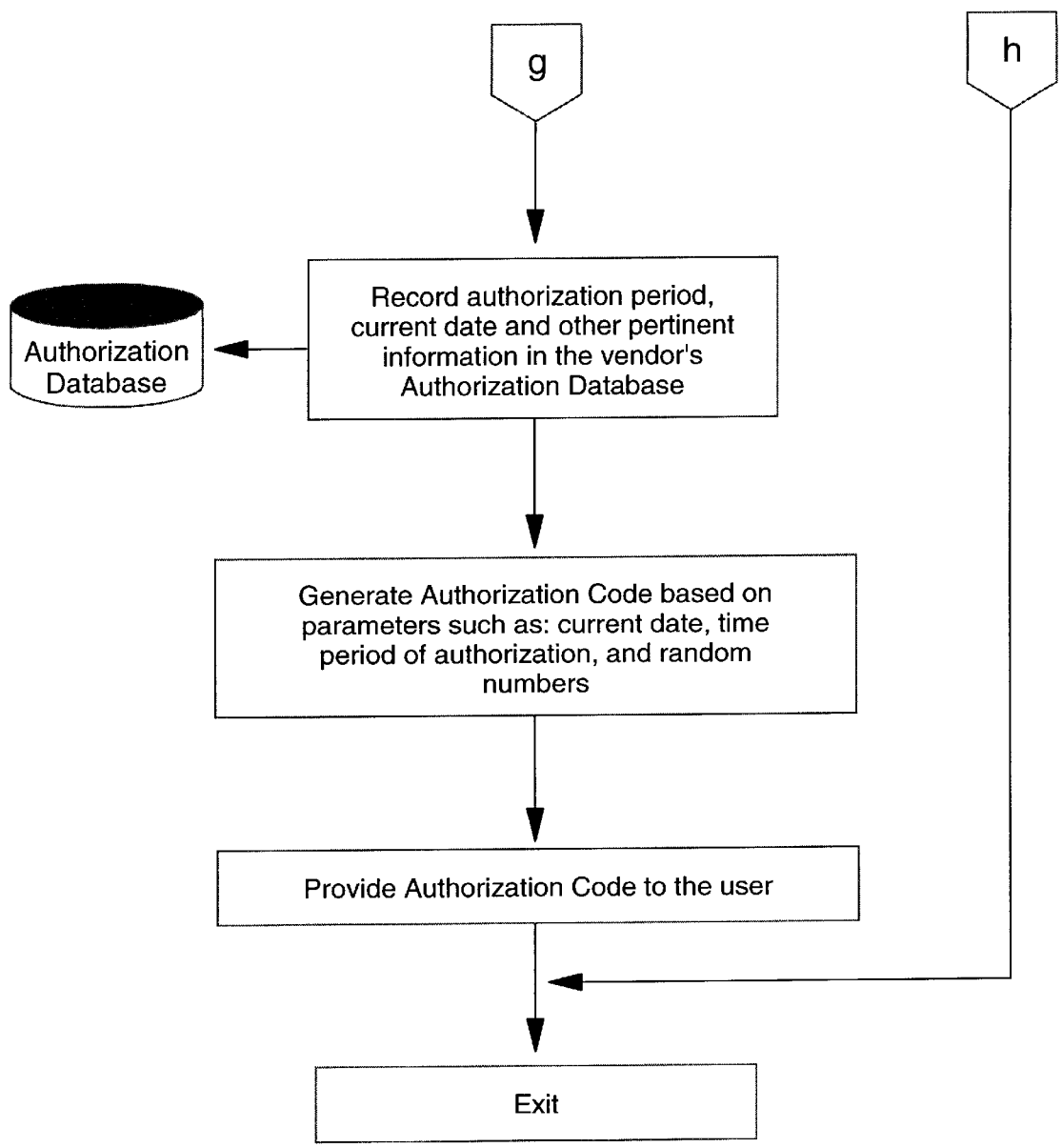
Figure 7-B

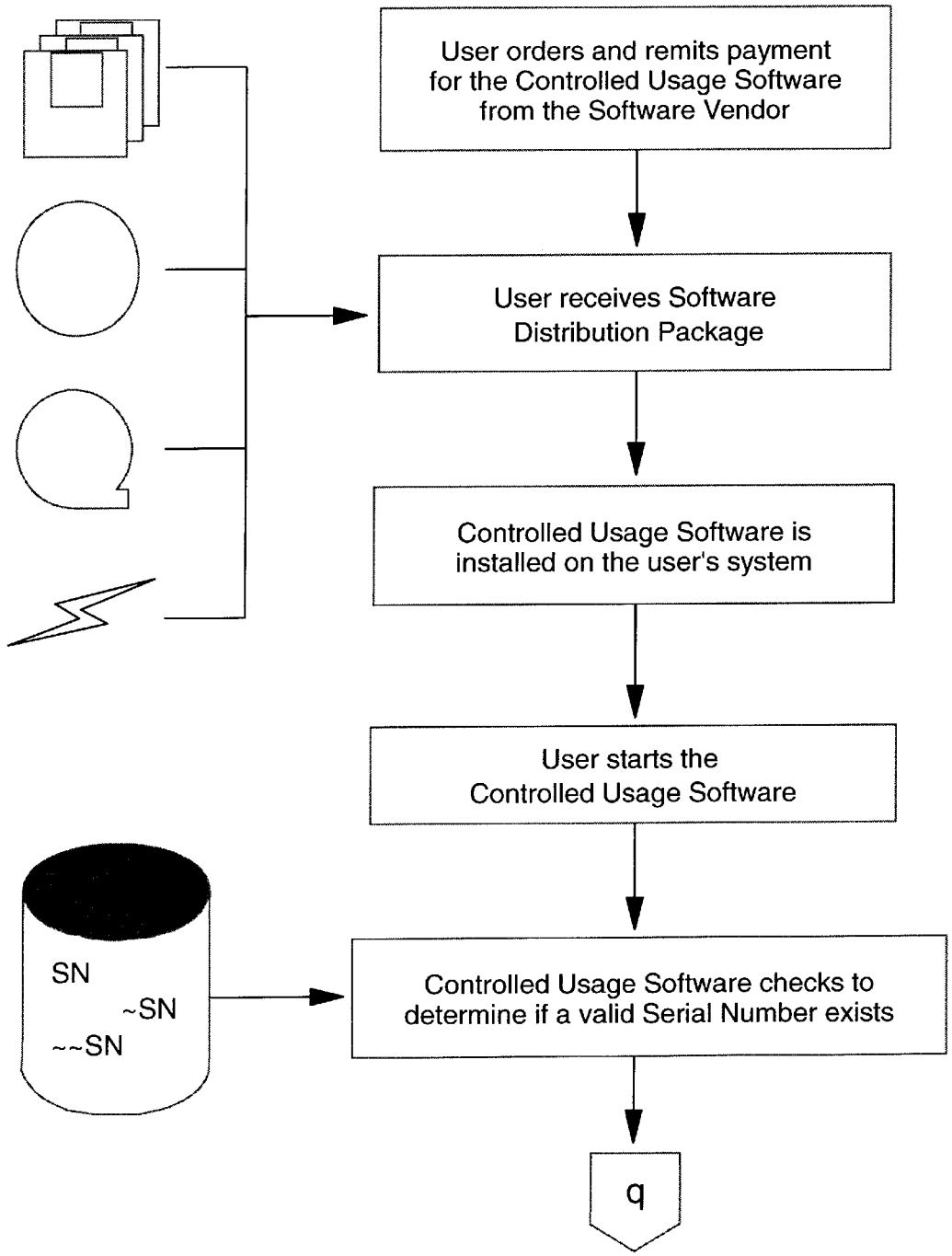
Figure 9-A

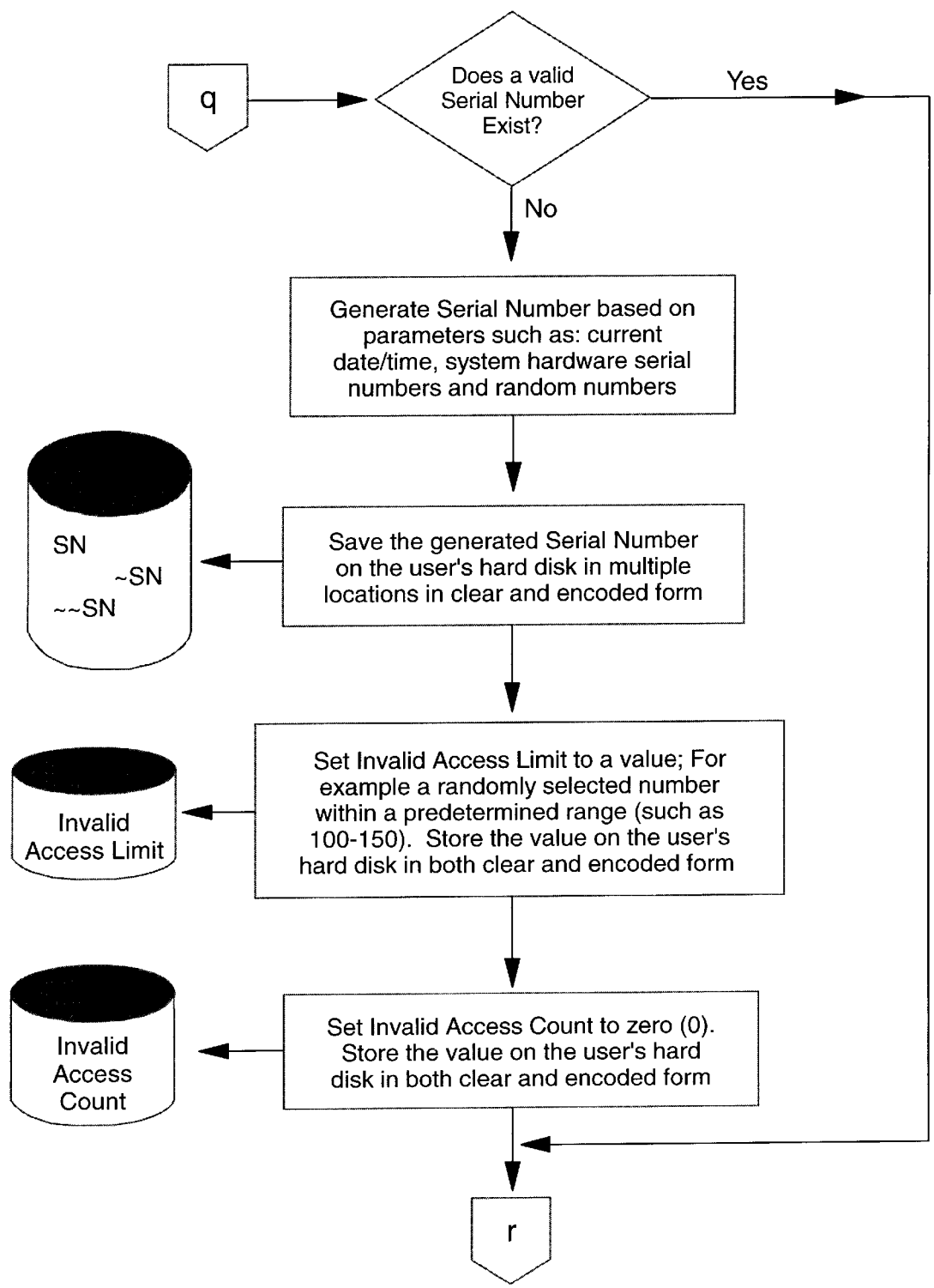
Figure 9-B

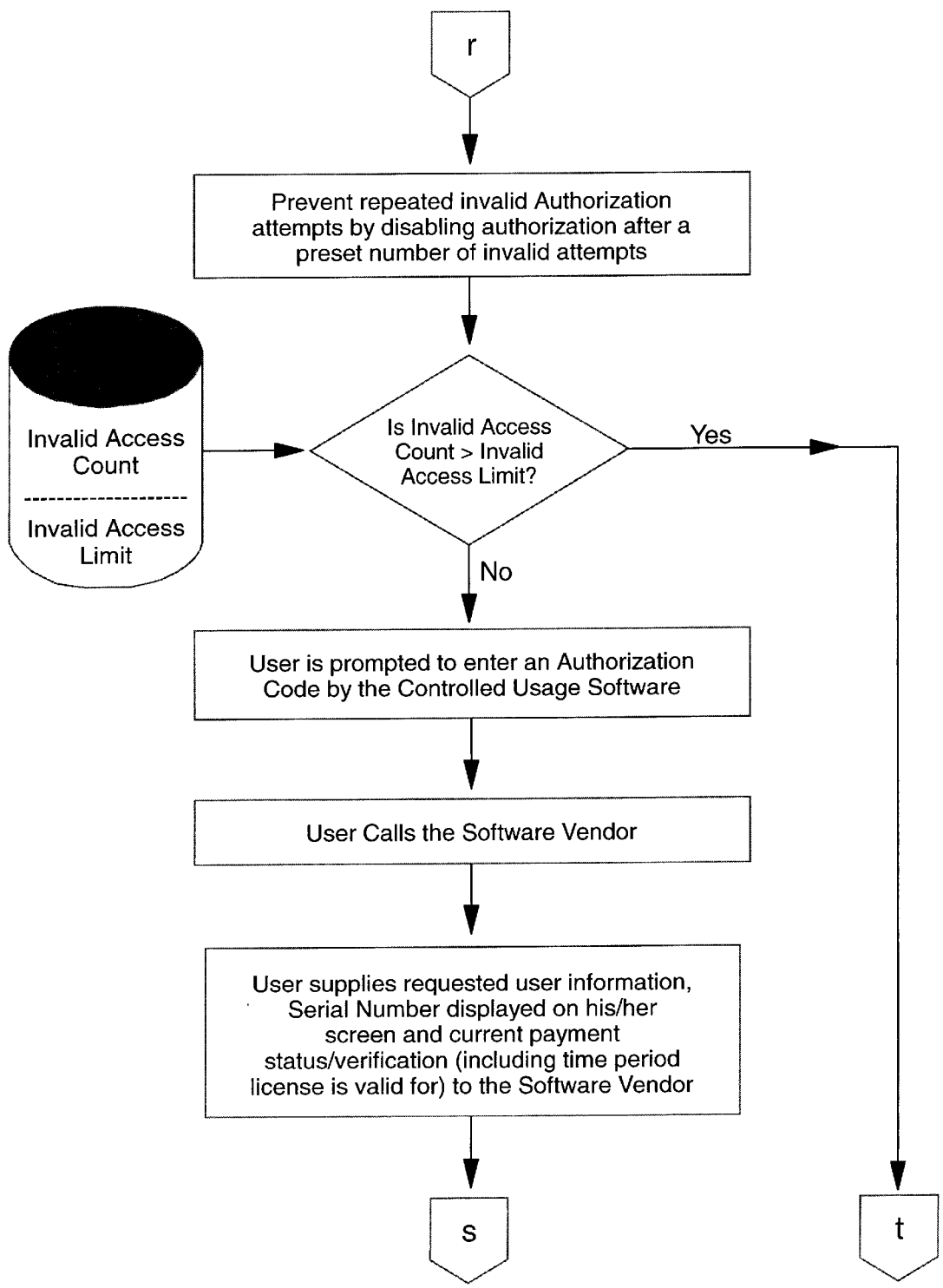
Figure 9-C

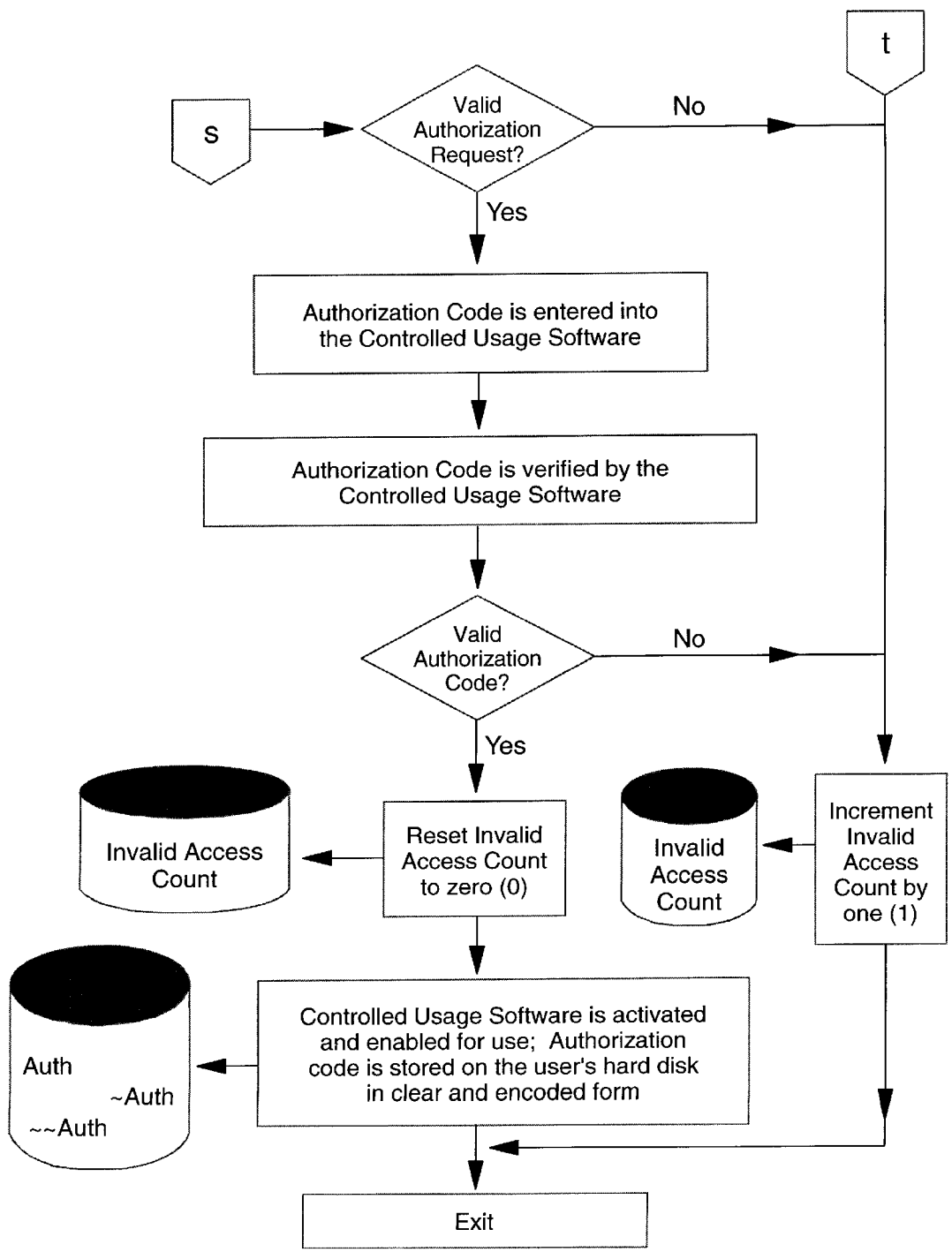
Figure 9-D

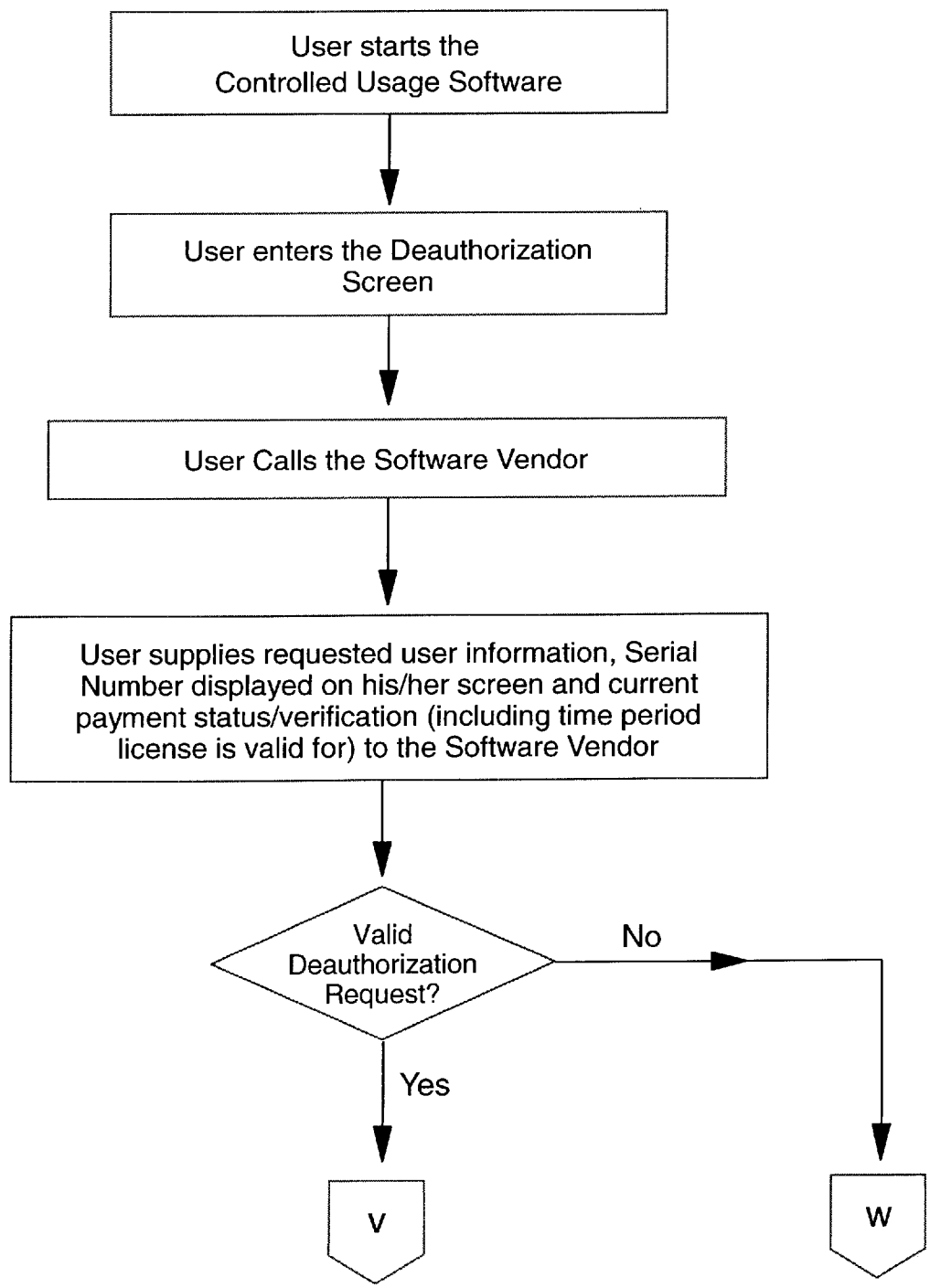
Figure 10-A

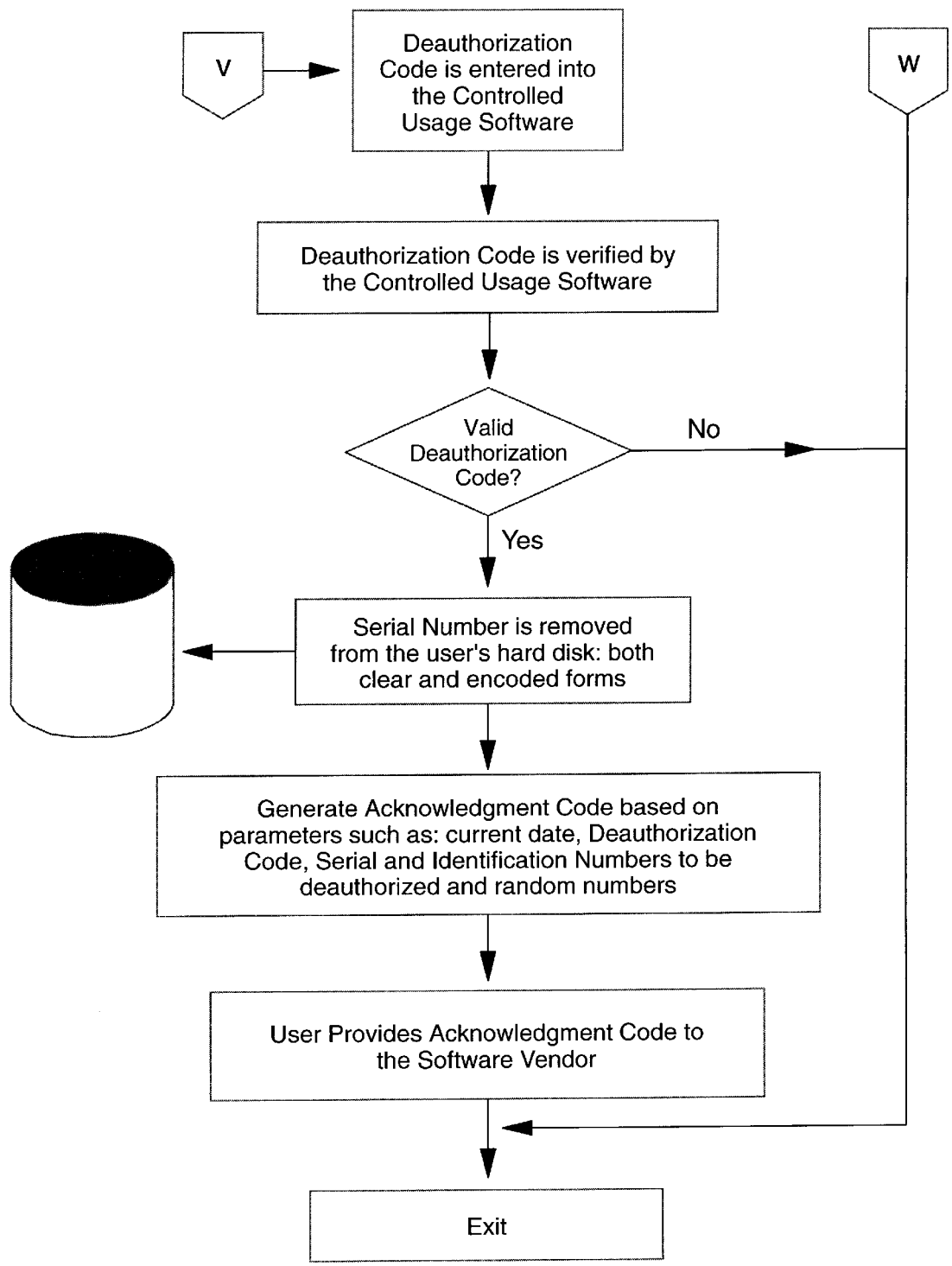
Figure 10-B

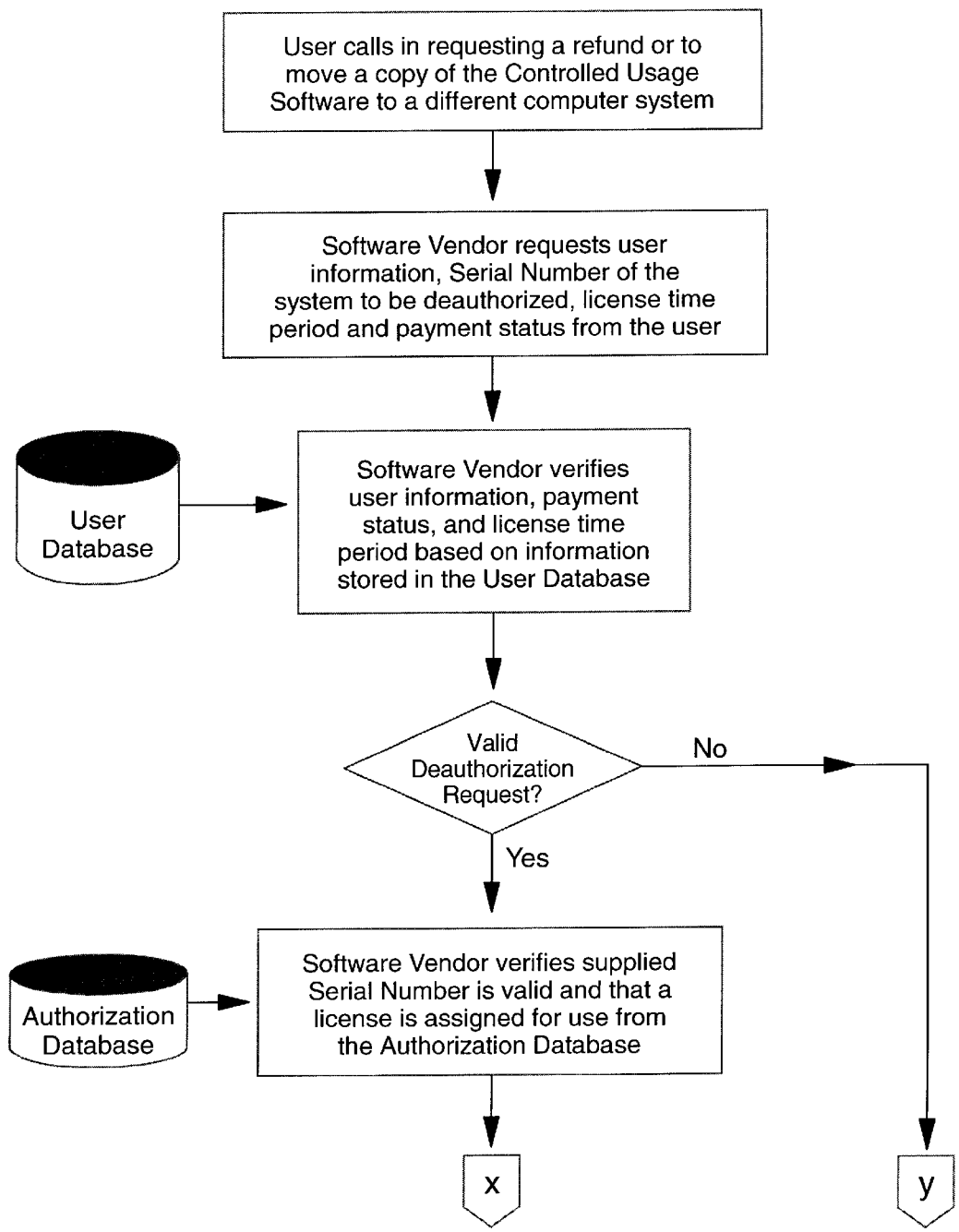
Figure 11-A

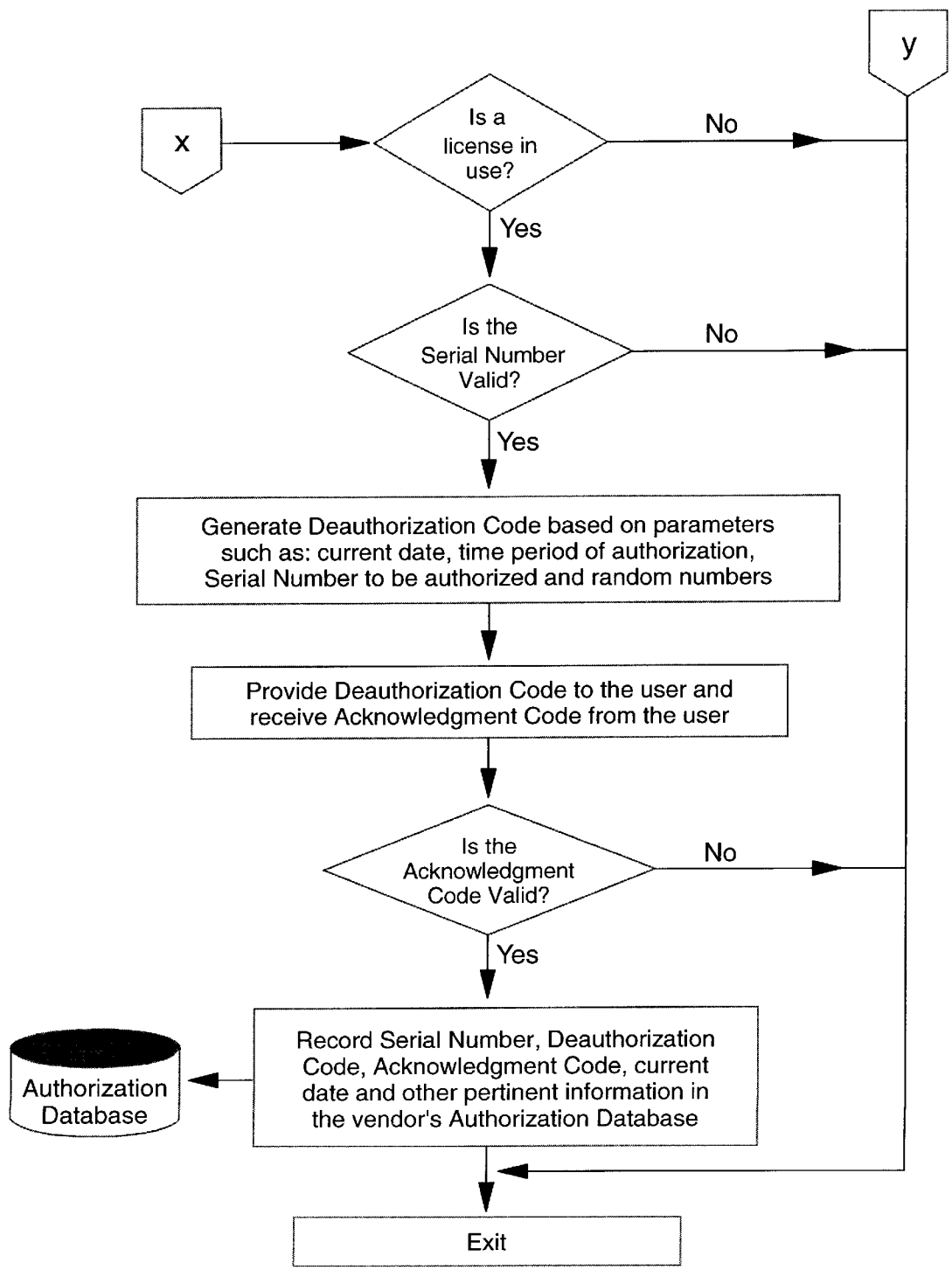
Figure 11-B

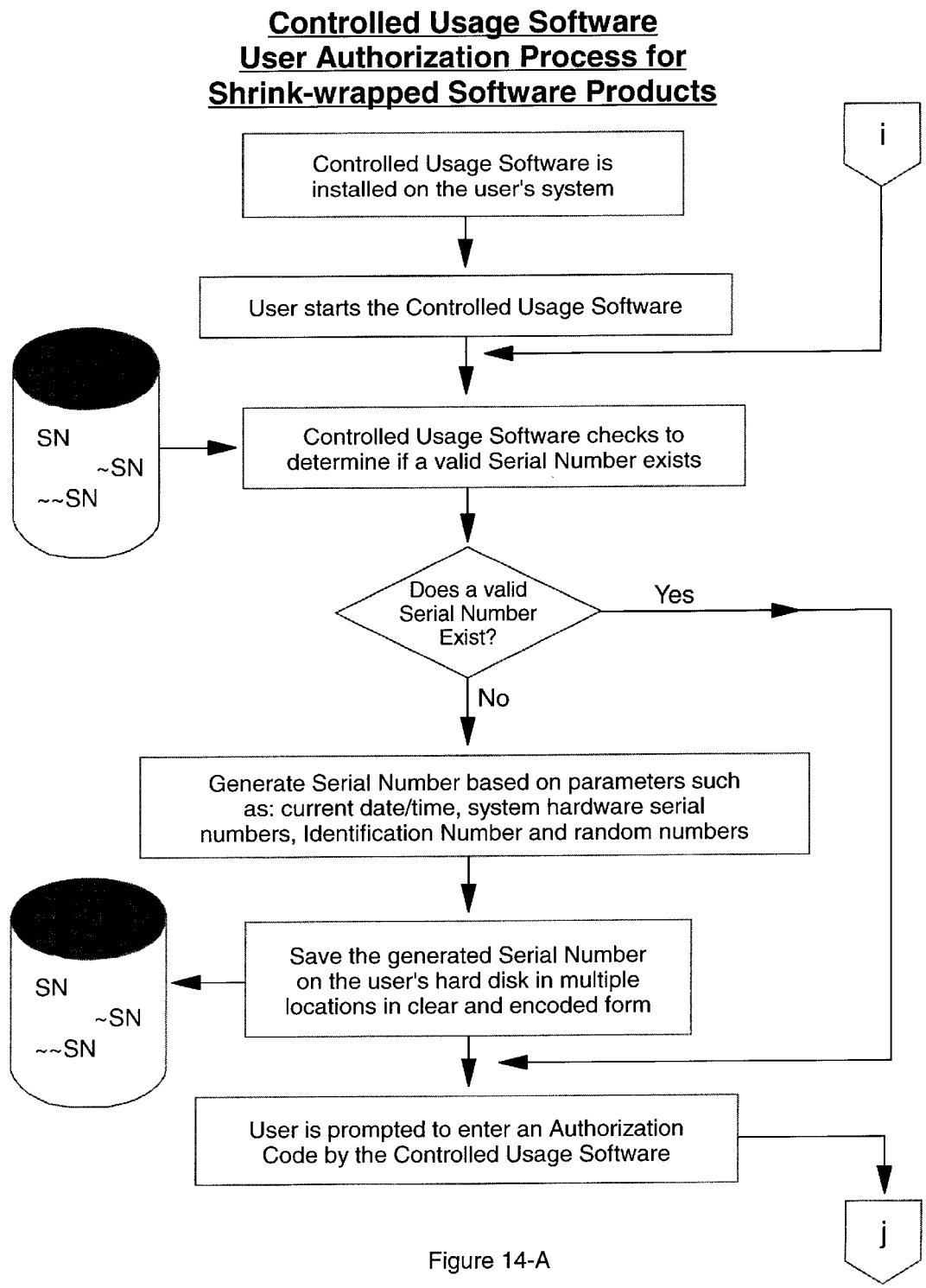
Figure 14-A

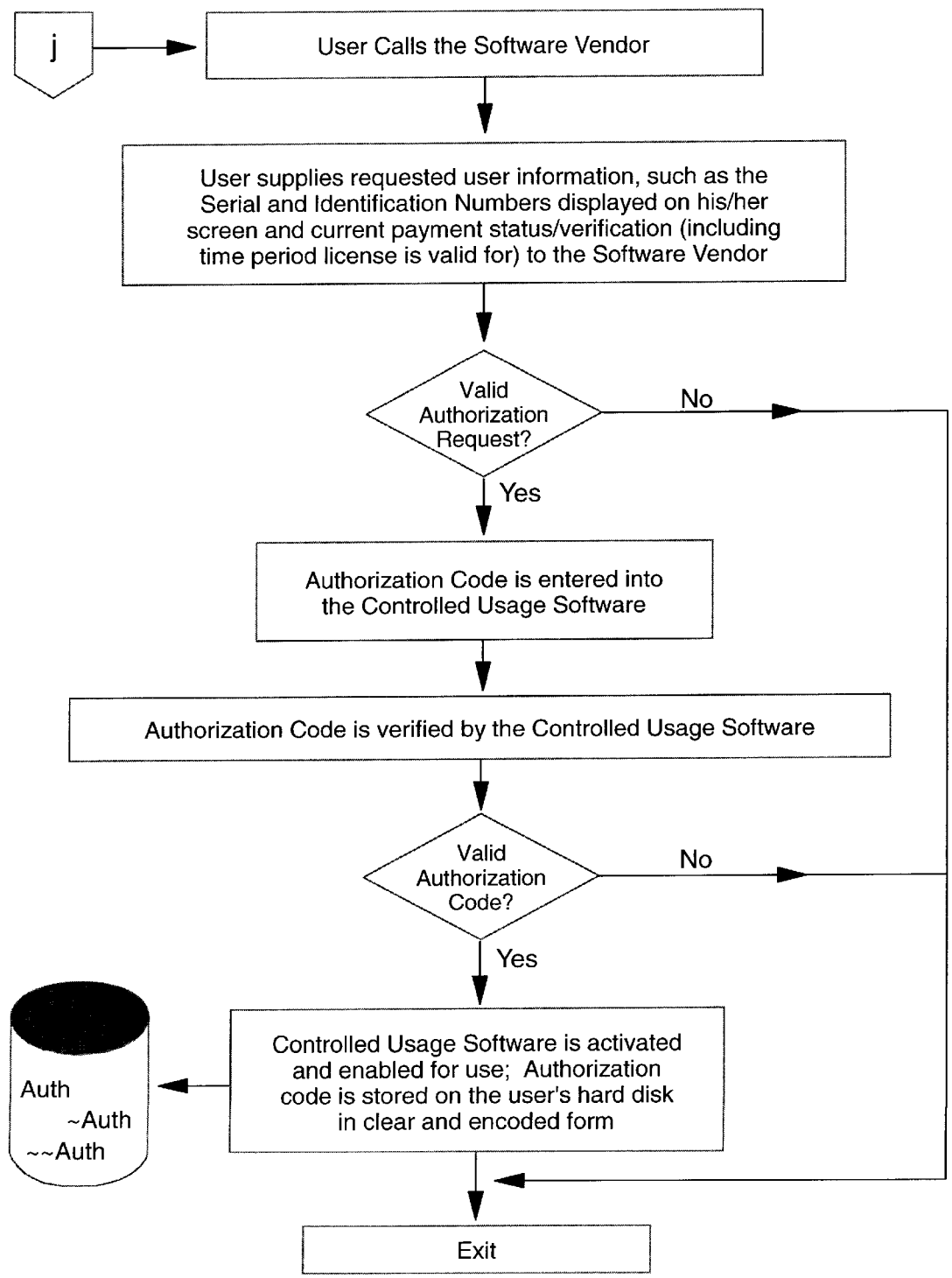
Figure 14-B

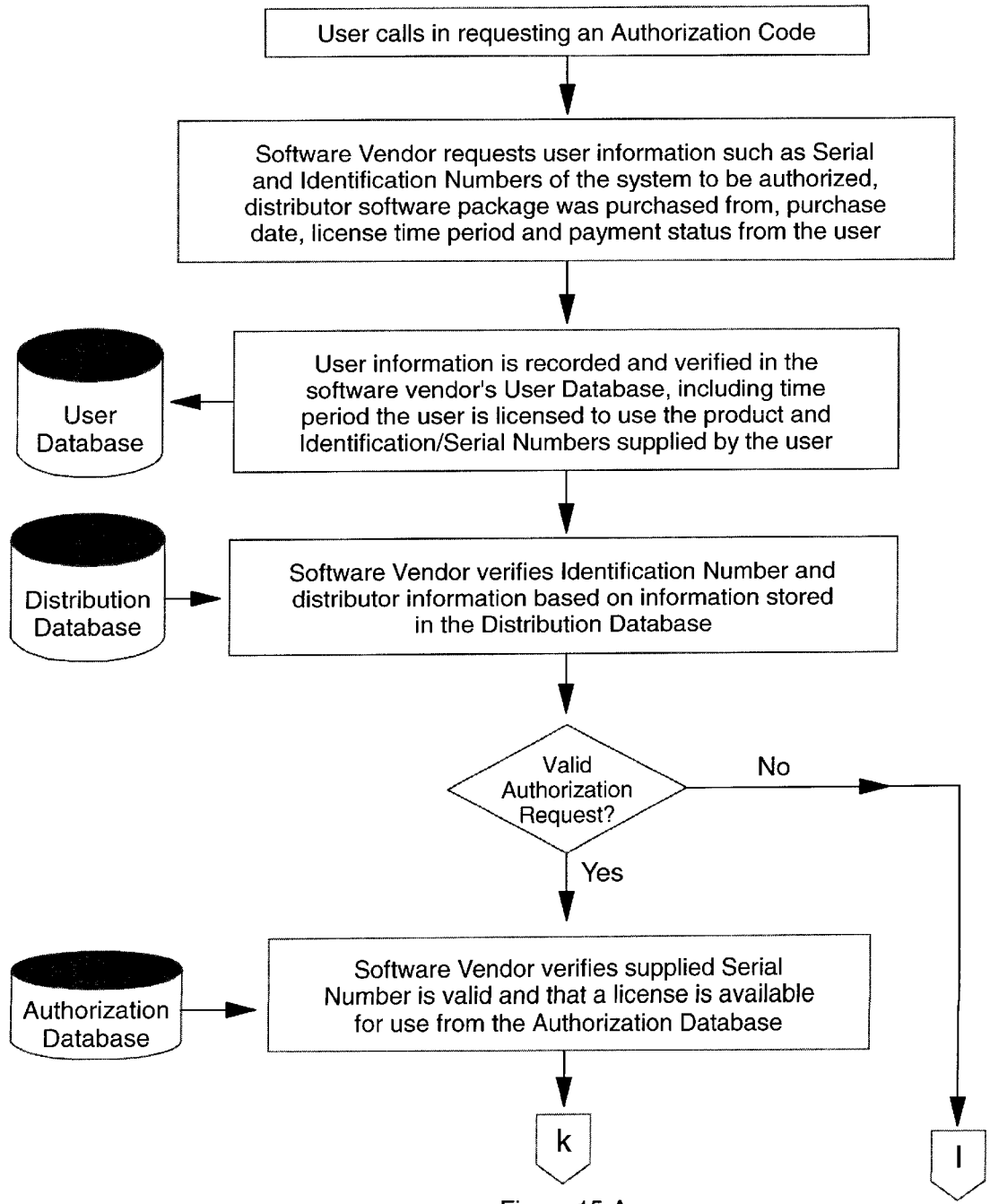
Figure 15-A

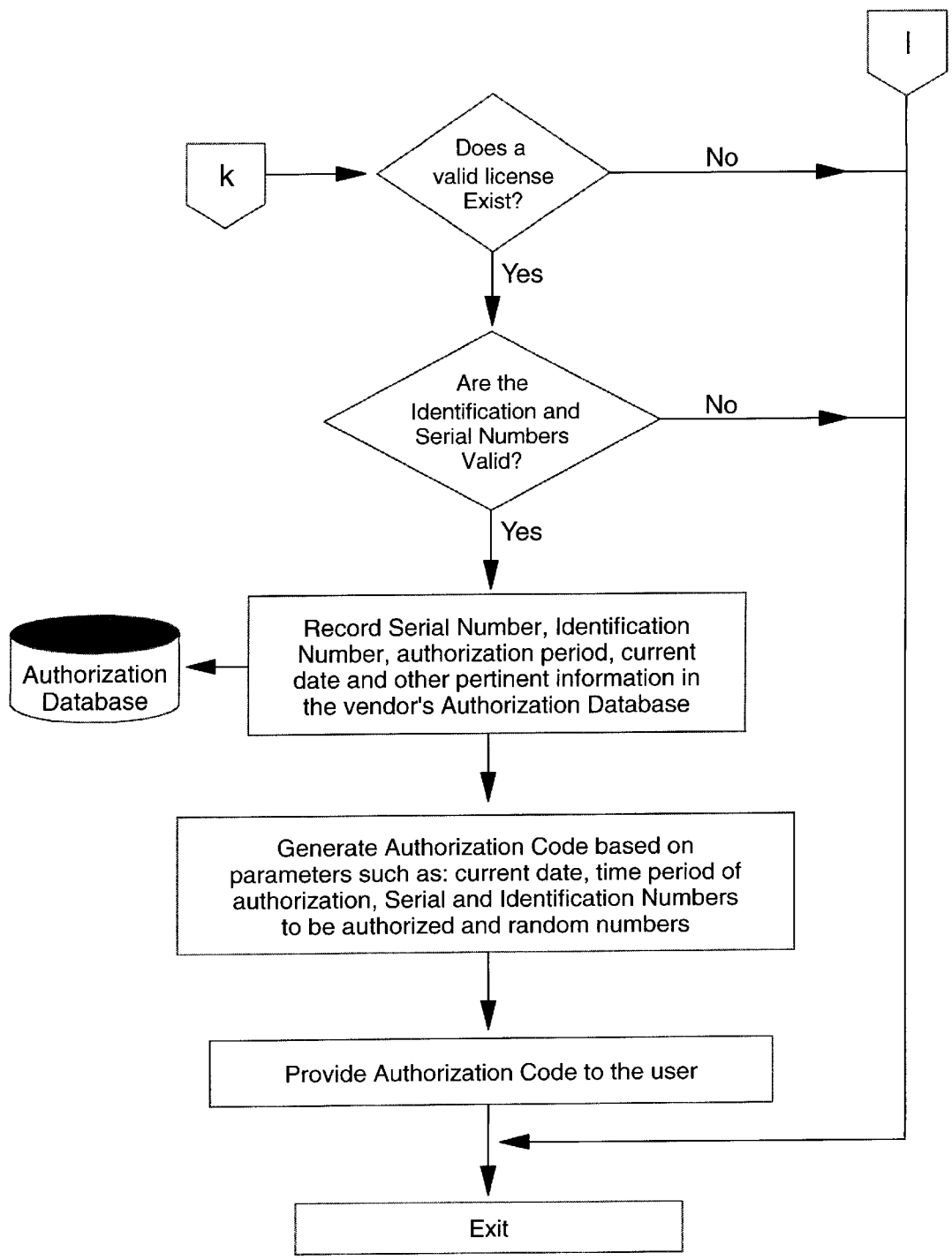
Figure 15-B

CONTROLLED USAGE SOFTWARE

CROSS-REFERENCE TO RELATED APPLICATION

This application is related to an earlier filed and now abandoned application by Katherine Sprong entitled "CONTROLLED USE SOFTWARE," filed on Dec. 8, 1997 and given Ser. No. 08/986,546 and is a continuation-in-part of application Ser. No. 09/004,143, filed Jan. 7, 1998. The teachings of this earlier application are incorporated herein by reference to the extent that they do not conflict with the teachings herein.

BACKGROUND OF THE INVENTION

1. Field of the Invention

This invention relates generally to computer software and the security of computer software programs. More particularly, this invention relates to a system and method for protecting computer software from unauthorized use and/or copying.

2. Description of the Related Art

Most computer software programs are distributed as machine-readable information recorded on some form of storage medium (e.g., floppy disk, CD-ROM). These programs are run simply by loading the storage medium into a suitable, computer memory device for subsequent use.

In the absence of any copy protection, anyone who has physical possession of the distribution storage medium can make several copies of that computer software and each copy may be used on a separate computer system. Although making back-up copies of software is normally desirable, allowing numerous unauthorized copies is very undesirable. Unfortunately, such unauthorized copying is widespread and deprives the software suppliers legitimate sales and therefore revenue.

Prior art methods have been developed to try to protect computer software. However, these all have various failings as evidenced by the extensive amount of unauthorized copying which is known to exist today. The Software Publishing Association, an industry group of more than 900 firms, estimated that in 1993 the industry lost more than $2.5 billion to this problem.

One such software protection method is "copy protection" where a non-standard disk format is used for recording a software program onto the distribution medium. A short, machine language program, in standard format, is included as an auxiliary program on the disk. This machine language program tells the computer how to read the non-standard format in which the program is recorded. Since standard copying programs can only read or write data in standard format, copying of this program is considerably more difficult, but not impossible.

The use of such "copy protected" software led to the development and sale of numerous "bit copier" utility programs, which, unlike standard copy utilities, can produce executable duplicates of such programs. Thus, this form of media copy protection discourages, but did not prevent unauthorized software copying.

Another method or approach to software protection is to use an electronic security device, sometimes called a dongle, which attaches to one of the computer's external/internal ports. Programs which are to be protected in this way must make procedure calls which interrogate the port to make sure the dongle is in place, and that the dongle has a unique identifier which matches the unique identifier embedded in a location within the program. If the dongle is not there, or if one is attached which has a non-matching identifier, the program terminates. Various manufacturers of such devices continue to sell them to software vendors, but most software is still sold without these devices, either because of cost criteria or the lack ox acceptance by software purchasers.

Still another approach to software protection requires the user to utilize a secret code or password which must be obtained from the software supplier and entered when using the software. However, this approach still does not preclude unauthorized copying since the code or password can be obtained by one person and can be given to many other users.

Other such methods requiring interaction between the software user and the software vendor have been developed. For example, U.S. Pat. No. 4,658,093 discloses a secure distribution system for software comprising: a base unit on which the software is to be installed, a remote authorization unit and communications means between them, wherein the base unit comprises means for: (i) inhibiting use of the software without authorization from the remote unit, (ii) requesting authorization, (iii) receiving and verifying authorization, and (iv) permitting authorized use, and wherein the remote unit comprises means for processing and providing authorization. The medium containing the software itself is seen to be relatively passive in this protection scheme.

U.S. Pat. No. 4,688,169 discloses a security system for restricting execution of software to a particular machine comprising unique identification numbers for individual computers, software with the capability to determine and store the identification numbers of the computers on which it is running, plus, when an attempt is made to run the software on a different computer, to compare the identification numbers and prevent further execution if the numbers do not match.

U.S. Pat. No. 5,199,066 discloses method and system for protecting software from unauthorized copying. The method comprises the steps of: (1) inputting both a hardware code corresponding to the hardware on which the software is to run and a first software code for the particular embodiment of the software, (2) operating on these codes to yield a first intermediate code, (3) inputting an activation code obtained from the software vendor, (4) operating upon the first intermediate code and the activation code to yield a second intermediate code, (5) comparing the second intermediate code with a second software code uniquely associated with the particular embodiment of the software being employed and stored at a hidden location within the software, the second software code not being ascertainable by the user, and (6) enabling the software if the second intermediate code and the second software code are identical.

Other forms of software protection have been developed and employed with limited success, In some cases, the other forms of protection are too expensive to employ with some software. In other cases, these other forms of protection are not technically suitable for some software.

Despite this prior art, the need exists for an invention that can provide for distributing software to users and allowing the users to conveniently install and use the software while, at the same time, protecting the interests of the software suppliers by preventing the unauthorized use of the software.

SUMMARY OF THE INVENTION

The present invention is generally directed to satisfying the need set forth above. More particularly, this invention is directed to an improved system and method for preventing the unauthorized use of computer software.

In accordance with a first preferred embodiment of the present invention, the foregoing need can be satisfied by providing a system for preventing unauthorized use of a software program recorded within a storage medium, comprising:

means recorded on the storage medium along with said software program for directing one requesting to use said software to input into the host computer information uniquely identifying one requesting to use said software program, wherein said information includes at least one from among the group consisting of the user's name, address, phone number, social security number, bank account number, corporate tax identification number and number of the credit card previously used to purchase a license to use said software, means recorded on the storage medium for storing within the host computer said user inputted information, a remote authorization unit that authorizes use of the software, wherein said authorization unit includes a stored and maintained database with information about all authorized users of the software including at least one from among the group consisting of authorized user's name, address, phone number, social security number, bank account number and number of the credit card previously used to purchase a license to use said software, in addition to information regarding date on which any previous use was authorized, duration and extent of authorized use, means recorded on the storage medium for directing one requesting to use said software to communicate said user information to remote authorization unit for the purposes of obtaining an authorization code that can be inputted to enable use of said software, means within the authorization unit for comparing said communicated user information with said authorization unit database of information identifying authorized users of said software to verify that one requesting use of said software is an authorized user, means within authorization unit for generating an authorization code if one requesting to use said software is an authorized user, wherein said authorization code is generated by an authorization code algorithm that operates on at least one parameter from among the group consisting of said inputted user information, the date on which the authorization code is being requested, and the dates of the period of authorized use, in addition to random numbers that provide uniqueness to the authorization code and prevent one from deciphering the authorization code to ascertain the parameters operated on by said algorithm, means recorded on the storage medium for directing one requesting to use said software to input and store said authorization code into host computer, wherein said authorization code is stored in both clear and encoded form, means recorded on storage medium for retrieving stored user information and operating on said information with the same said authorization code algorithm to generate within the host computer an analogous authorization code, means recorded on storage medium for comparing said analogous authorization code generated within the host computer with the authorization code received from said authorization unit, means recorded on the storage medium for enabling the use of said software if analogous authorization code generated within the host computer and the authorization code received from said authorization unit are substantially similar, means recorded on the storage medium for inhibiting use of the software unless an authorization code received from remote authorization unit has been inputted into the host computer and said authorization code is substantially similar to said analogous authorization code generated within the host computer, and means within authorization unit for updating authorization unit database by associating user's information contained in said database with at least one parameter chosen from the group consisting of said authorization code, the date on which the authorization code is being requested, and the end-point dates of the period of authorized use.

The means for achieving the steps listed above and in the following discussions of other preferred embodiments in accordance with the present invention are well known in the art and are, in part, described herein.

In a second preferred embodiment, further protective means are achieved by augmenting the above described system with the capability to generate and store within the host computer a serial number that uniquely identifies the particular host computer on which the software is to be used. This capability is provided by first preferred embodiment system further comprising:

means recorded on the storage medium for generating a serial number uniquely associated with the particular host computer on which the software is to be used, wherein said serial number is generated by execution of a serial number algorithm which operates on input parameters including at least one from among the group consisting of serial numbers of various hardware components on the host computer system, date of serial number's generation, time of serial number's generation and a random number to provide uniqueness and prevent deciphering of the serial number algorithm, wherein with the use of said serial number it is no longer necessary for the system to have a means recorded on the storage medium along with said software program for directing one requesting to use said software to input into the host computer information uniquely identifying one requesting to use said software program, neither is it necessary for the user to input and store said information, means recorded on the storage medium for storing said serial number in both its original and an encoded form within the host computer, means recorded on the storage medium for directing one requesting to use said software to communicate said serial number along with user information to remote authorization unit, wherein the authorization unit database includes associated serial numbers for the host computers on which the authorized users are using the software, means within the authorization unit for updating authorization unit database by associating said inputted serial number with user's other information contained in said database, wherein said group of parameters on which said authorization code algorithm can operate includes the user's inputted serial number, wherein said authorization code algorithm recorded on the storage medium operates on at least one parameter from among the group consisting of the inputted and stored user's information, the serial number stored within the host computer, the date of the authorization code's generation and the end-point dates of the period of authorized use, to yield an analogous authorization code, and wherein use of said software is enabled if analogous authorization code generated within the host computer and the authorization code received from said authorization unit are substantially similar.

In a third preferred embodiment, further protective means are achieved by augmenting the above described systems with an authorization procedure to transfer in a controlled manner the use of said storage medium from one host computer to another, wherein said authorization transfer procedure is provided by second preferred embodiment system further comprising:

means recorded on the storage medium for directing one requesting to transfer said storage medium to communicate to remote authorization unit information uniquely identifying user seeking to transfer use of the storage medium, said information selected from the group consisting of information uniquely identifying user, the host computer serial number, and current authorization code expiration date, means within authorization unit for comparing said information uniquely identifying user seeking to transfer use of the storage medium, with database at authorization unit of analogous information identifying authorized users of said software to determine whether one seeking to transfer use of the storage medium is an authorized user and whether the inputted information matches the analogous information in the database for said user, wherein the existence of a match authorizes generation of a deauthorization code, means within the authorization unit for generating a deauthorization code if authorized to do so, wherein said deauthorization code is generated by execution of a deauthorization code algorithm which operates on parameters including at least one from among the group consisting of the serial number of host computer system, most recent authorization code, and the date on which the deauthorization code is being requested, in addition to random numbers to provide uniqueness and prevent deciphering of the deauthorization code algorithm, means within authorization database for updating authorization unit database by associating user's information contained in said database with at least one parameter chosen from the group consisting of said deauthorization code, the date on which the deauthorization code is requested, and the phone number of the one requesting a deauthorization code, means recorded on said storage medium for directing one seeking to transfer said storage medium to input said deauthorization code, means recorded on storage medium for retrieving same host computer stored parameter as operated on by the deauthorization code algorithm when used at the authorization unit and operating on said parameter with said deauthorization code algorithm to yield an analogous deauthorization code, said algorithm being available to the host computer due to deauthorization code algorithm having been recorded on the storage medium containing the software whose storage medium transfer is requested, means recorded on the storage medium for comparing said analogous deauthorization code generated within the host computer with the deauthorization code received from said authorization unit, means recorded on the storage medium for disabling the use of said software if analogous deauthorization code generated within the host computer and the deauthorization code received from said authorization unit are substantially similar, means recorded on the storage medium for erasing the serial number stored in the host computer if analogous deauthorization code generated within the host computer and the deauthorization code received from said authorization unit are substantially similar, means recorded on the storage medium for generating an acknowledgment code which verifies that the software has been disabled, wherein said acknowledgment code is generated by execution of an acknowledgment code algorithm which operates on parameters including at least one from among the group consisting of the serial number of host computer system, the most recently received authorization code, deauthorization code and the date on which the acknowledgment code is generated, in addition to random numbers to provide uniqueness and prevent deciphering of the acknowledgment code algorithm, means recorded on the storage medium for directing one seeking to transfer storage medium to communicate said acknowledgment code to the remote authorization unit, means within the authorization unit for retrieving from the authorization unit database the version of the same parameter operated on by said acknowledgment code algorithm after disabling said software and operating on said version of parameter with same said acknowledgment code algorithm to yield an analogous acknowledgment code, means within the authorization unit for comparing said analogous acknowledgment code generated at the authorization unit with the acknowledgment code received from the user, and means within the authorization unit for updating said user database information so as to indicate that user is authorized to use said storage medium on another host computer if analogous acknowledgment code generated at the authorization unit and the acknowledgment code received from the user are substantially similar.

In a fourth preferred embodiment, further protective means are achieved by augmenting the above described systems with the means for uniquely identifying each embodiment of the storage medium containing said software, thereby making it possible to individually track each embodiment of the storage medium and to recognize when such an embodiment may have been copied before its installation on a host computer or installed on multiple host computers, wherein said identification are provided by third preferred embodiment further comprising:

means for providing each embodiment of the storage medium containing the software program with a unique identification number, wherein said identification number is a member of the groups of parameters selected for operation upon by said serial number, authorization, deauthorization and acknowledgment code algorithms and is associated with user information stored within the authorization unit database, and wherein with the use of said identification number it is no longer necessary for the authorization unit database to contain information uniquely identifying authorized users when one requesting an authorization code initially causes contact to be made with the authorization unit, said user information can now be collected at the first time of contact with the authorization unit.

In a fifth preferred embodiment, further protective means are achieved by augmenting the above described systems with the means for preventing hackers from inputting an unlimited number of invalid authorization codes in an attempt to enable use of said software, wherein said means for providing said additional protection is provided by fourth preferred embodiment further comprising:

means recorded on the storage medium for using a random number algorithm to set within a predetemined range of values the maximum number of times that one consecutively may input an invalid authorization code into the host computer and have said authorization code algorithm, that is encoded on the storage medium, operate on stored user information to yield an analogous authorization code which is to be compared with the inputted authorization code to determine whether they are substantially similar, wherein such substantial similarity is the criteria that must be met in order to enable use of the software, means recorded on the storage medium for establishing an access-attempt counter, that counts the number of consecutive times an invalid authorization code is entered, wherein said access counter is set to zero when said software is initially installed on the host computer, wherein the count of said access-attempt counter is increased by one each time an invalid authorization code is entered, and the access-attempt counter is reset to zero when a valid authorization code is entered, means recorded on the storage medium for comparing, upon the entry of an authorization code, the number within the access-attempt counter with said set maximum number of consecutive times that one may input an invalid authorization code into the host computer, and means recorded on the storage medium for enabling said authorization code algorithm to operate on said group of parameters to yield an analogous authorization code if and only if the number within the access-attempt counter is less than or equal to said set maximum number of consecutive times that one may input an invalid authorization code into the host computer.

This new and improved "controlled usage software" is seen to achieve its object of preventing the unauthorized use of computer software.

Other objects and advantages of this invention will become readily apparent as the invention is better understood by reference to the accompanying drawings and the detailed description that follows.

BRIEF DESCRIPTION OF THE DRAWINGS

FIGS. 1–4 depict from various perspectives the distribution and use of software in accordance with a preferred embodiment of the invention. In this embodiment the unauthorized use of the software is prevented by the use of both a serial number which is uniquely associated with the particular host computer on which the software is to be used and an identification number which uniquely identifies each embodiment of the storage medium containing the software.

FIG. 1 is a schematic flow diagram which depicts the general software distribution process of a software vendor.

FIG. 2($a$) is the initial portion of a schematic flow diagram which depicts the general process whereby a software user acquires, installs and uses such computer software.

FIG. 2($b$) is the middle portion of a schematic flow diagram which depicts the general process whereby a software user acquires, installs and uses such computer software.

FIG. 2($c$) is the final portion of a schematic flow diagram which depicts the general process whereby a software user acquires, installs and uses such computer software.

FIG. 3($a$) is the initial portion of a schematic flow diagram which depicts the general process whereby a software vendor authorizes and manages use of such computer software.

FIG. 3($b$) is the final portion of a schematic flow diagram which depicts the general process whereby a software vendor authorizes and manages use of such computer software.

FIG. 4 is a schematic flow diagram which depicts the general process whereby a software user starts up such computer software.

FIGS. 5–8 depict from various perspectives the distribution and use of software in accordance with another preferred embodiment of the invention. In this embodiment the unauthorized use of the software is prevented by the use of an authorization code that is based only on information uniquely identifying one requesting to use the software.

FIG. 5 is a schematic flow diagram which depicts the general software distribution process of a software vendor in accordance with this second preferred embodiment of the invention.

FIG. 6($a$) is the initial portion of a schematic flow diagram which depicts the general process whereby a software user acquires, installs and uses such computer software.

FIG. 6($b$) is the final portion of a schematic flow diagram which depicts the general process whereby a software user acquires, installs and uses such computer software.

FIG. 7($a$) is the initial portion of a schematic flow diagram which depicts the general process whereby a software vendor authorizes and manages use of such computer software.

FIG. 7($b$) is the final portion of a schematic flow diagram which depicts the general process whereby a software vendor authorizes and manages use of such computer software.

FIG. 8 is a schematic flow diagram which depicts the general process whereby a software user starts up such computer software.

FIG. 9($a$)–9($d$) depict another preferred embodiment of the invention having hacker protection. Various portions of a schematic flow diagram are shown which depict the general process whereby a software user acquires and installs computer software having hacker protection and requiring the use of a serial number.

FIGS. 10–11 depict from the perspective of the user and the software vendor the deauthorization process involved in the transfer of the storage medium containing the software from one computer to another. In this embodiment, the unauthorized use of the software primarily is prevented by the use of a serial number that uniquely identifies the host computer on which the software is used.

FIG. 10($a$) is the initial portion of a schematic flow diagram which depicts the user's general deauthorization process.

FIG. 10($b$) is the final portion of a schematic flow diagram which depicts the user's general deauthorization process.

FIG. 11($a$) is the initial portion of a schematic flow diagram which depicts the software vendor's general deauthorization.

FIG. 11($b$) is the final portion of a schematic flow diagram which depicts the software vendor's general deauthorization process.

FIGS. 12–16 depict from various perspectives the distribution and use of shrink-wrap software in accordance with a preferred embodiment of the invention. In this embodiment the unauthorized use of the software is prevented by the use of both a serial number which is uniquely associated with the particular host computer on which the software is to be used and an identification number which uniquely identifies each embodiment of the storage medium containing the software.

FIG. 12 is a schematic flow diagram which depicts the general shrink-wrap software distribution process of a software vendor.

FIG. 13 is a schematic flow diagram which depicts the general sales process for shrink-wrap software.

FIG. 14(a) is the initial portion of a schematic flow diagram which depicts the general process whereby a shrink-wrap software user acquires and installs such software.

FIG. 14(b) is the final portion of a schematic flow diagram which depicts the general process whereby a shrink-wrap software user acquires and installs such software.

FIG. 15(a) is the initial portion of a schematic flow diagram which depicts the general process whereby a shrink-wrap software vendor authorizes use of such software.

FIG. 15(b) is the final portion of a schematic flow diagram which depicts the general process whereby a shrink-wrap software vendor authorizes use of such computer software.

FIG. 16 is a schematic flow diagram which depicts the general process whereby a shrink-wrap software user starts up such software.

DESCRIPTION OF THE PREFERRED EMBODIMENT

Figure 1:
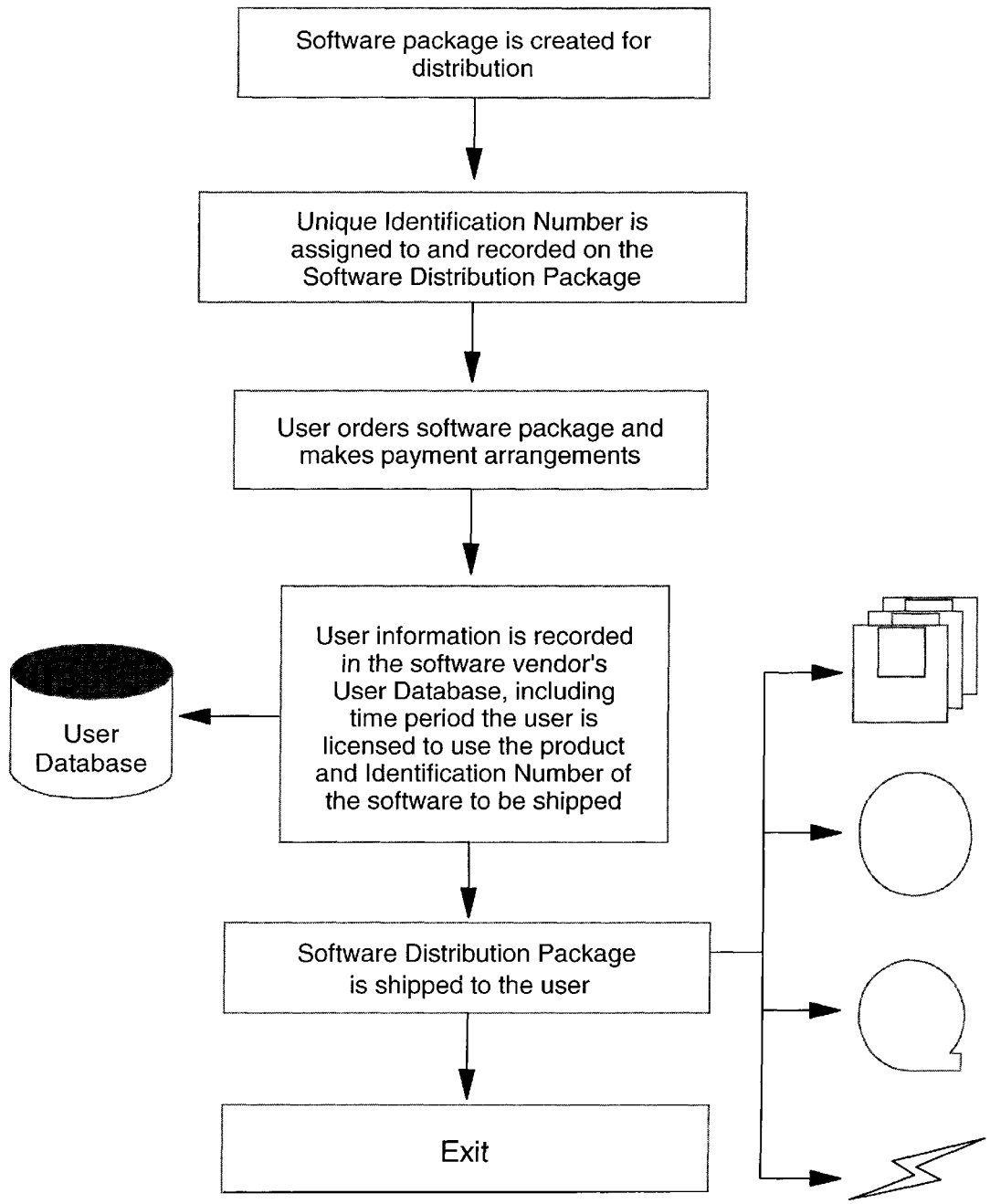

Referring now to the drawings wherein are shown preferred embodiments and wherein like reference numerals designate like elements throughout the several views, there is shown in FIGS. 1–4 schematic flow diagrams which depict the distribution and use of software in accordance with a preferred embodiment of the invention from the respective perspectives of the software user and vendor. In this embodiment the unauthorized use of the software is prevented by the use of both a serial number which is uniquely associated with the particular host computer on which the software is to be used and an identification number which uniquely identifies each embodiment of the storage medium containing the software.

FIG. 1 shows the software vendor's general distribution process with such software.

Figure 4:
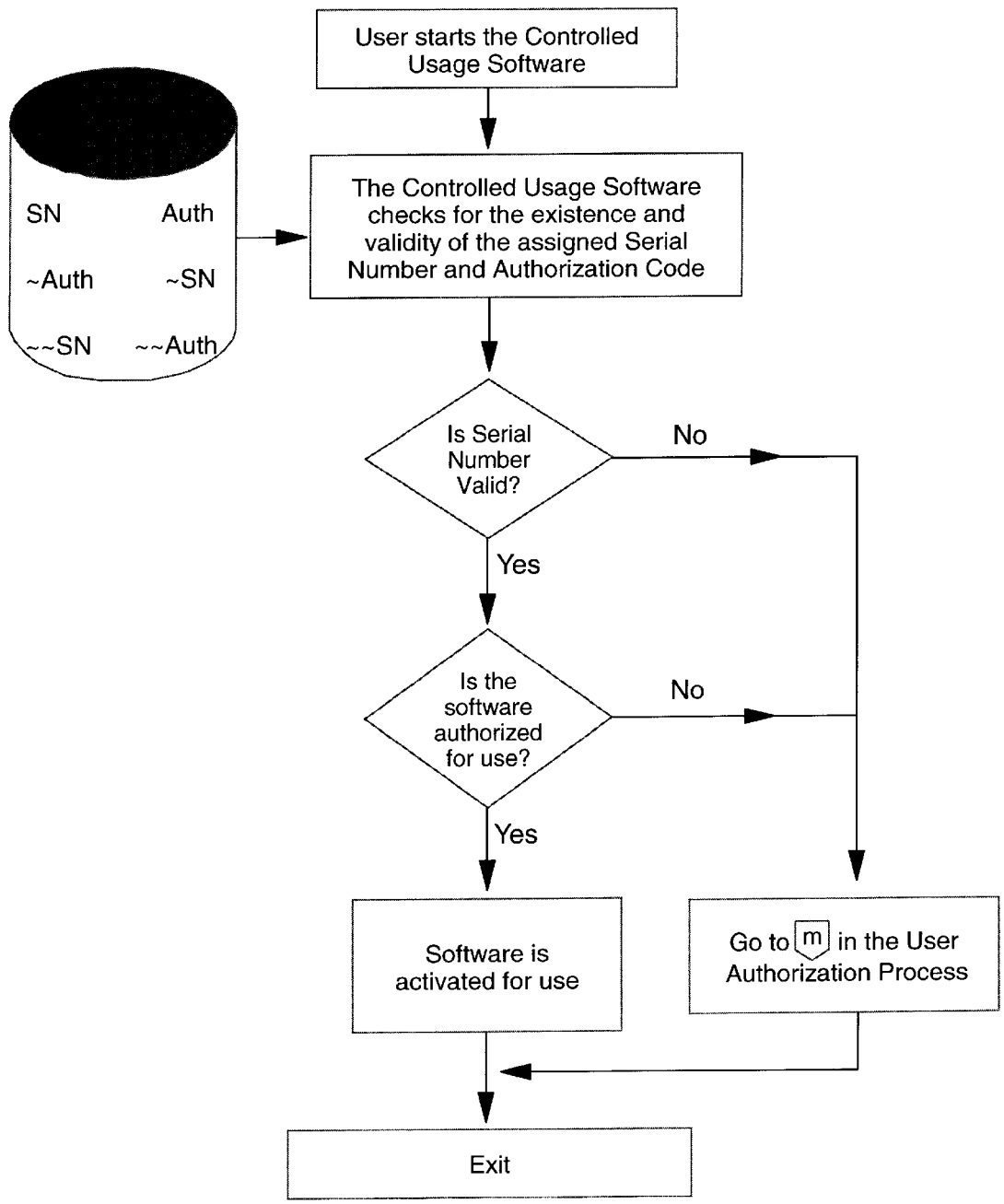

As shown in FIG. 2(a–c) and FIG. 4 from the software user's perspective and in FIG. 3 (a–b) from the software vendor's perspective, the method for preventing unauthorized use of an embodiment of the invention that uses both a serial number and an identification number, comprises the steps of: (1) providing each embodiment of the storage medium containing the software program with a unique identification number, (2) establishing a remote authorization unit that authorizes use of the software, wherein said authorization unit includes a stored and maintained database including information such as: information about all authorized users of the software, serial number of host computers on which the software is authorized for use, identification numbers of the embodiments of the storage medium on which the software is recorded, date on which any previous use was authorized, duration and extent of authorized use, wherein it is recognized that the authorization unit could be as simple a software vendor representative maintaining a handwritten notebook (i.e., database) and performing any required calculations on a hand calculator, (3) inputting and storing within the host computer information uniquely identifying one requesting to use the software, wherein this information may include such parameters as: the user's name, address, phone number, social security number, bank account number, corporate tax identification number and number of the credit card previously used to purchase a license to use the software, wherein it is understood that this listing of possible parameters is only representative of those that could be chosen, with the listing not meant to be exhaustive, (4) generating a serial number uniquely associated with the particular host computer on which the software is to be used, wherein said serial number is generated by execution of a serial number algorithm which operates on input parameters such as: serial numbers of various hardware components on the host computer system, date of serial number's generation, time of serial number's generation and random numbers to provide uniqueness and prevent deciphering of the serial number algorithm, wherein it is understood that this listing of possible parameters is only representative of those that could be chosen, with the listing not meant to be exhaustive, (5) storing the serial number in both its original and an encoded form in some nonobvious location in the host computer (e.g., a hidden file in the operating system directory), wherein the storing of the serial number in this manner allows a check to be made that the serial number has not been modified, and if it has been modified, the operation of the software can be disabled, (6) communicating the serial number, identification number and user information uniquely identifying one requesting to use the software to a remote authorization unit for the purposes of obtaining an authorization code that can be inputted into the host computer to enable use of the software, (7) comparing communicated identification number with a database at the authorization unit of analogous numbers to verify that an authorization code has not previously been issued that would enable use of the embodiment of the storage medium containing the software, (8) collecting user information and serial number and including this data in the database maintained at the authorization unit, (9) generating an authorization code if identification number valid and the number of permitted host computers for the identification number has not been reached, wherein the authorization code is generated by an authorization code algorithm that operates on parameters such as: inputted user information, identification number, serial number, the date on which the authorization code is being requested, the end-point dates of the period of authorized use, and random numbers that provide uniqueness to the authorization code and prevent one from deciphering the authorization code to ascertain the parameters operated on by said algorithm, wherein it is understood that this listing of possible parameters is only representative of those that could be chosen, with the listing not meant to be exhaustive, (10) communicating the authorization code to one requesting an authorization code, (11) inputting the authorization code into the host computer, (12) storing the authorization code in both clear and encoded form in some nonobvious location in the host computer (e.g., a hidden file in the operating system directory), wherein the storing of the authorization code in this manner allows a check to be made that the authorization code has not been modified, and if it has been modified, the operation of the software can be disabled, (13) using within the host computer same said authorization code algorithm to operate on the host computer stored versions of the same parameters operated upon by the authorization code algorithm at the authorization unit to yield an analogous authorization code, said algorithm being available to the host computer due to authorization code algorithm having been recorded on the storage medium containing the software whose use is requested, (14) comparing the analogous authorization code generated within the host computer with the authorization code received from the authorization unit, (15) enabling the use of the software if analogous authorization code generated within the host computer and the authorization code received from the authorization unit are substantially similar, and (16) updating authorization unit database by associating identification number contained in said database with received serial number, user information and one or more parameters documenting the issuance of the authorization code, such as: the authorization code, the date on which the authorization code was issued, and the end-point dates of the period of authorized use.

Wherein, the terminology "substantially similar" has been specifically used above to allow for the use of complex encoding algorithms that cannot easily be deciphered or cracked by one who would use such information to circumvent the protective-use qualities of the software. In this context, two parameters or strings of numbers and/or letters are defined to be "substantially similar" if they, or predefined subsets of them, are upon comparison found to have a unique, vendor-specified, mathematical relationship between the parameters. For example, one could use an encoding algorithm that would generate an authorization code based on the following parameters: the date on which authorized use was requested, the serial number of the computer on which use of the software is to be authorized, the number of days for which use of the software is authorized, and random numbers as follows:

$$\text{Authorization Code} = R_1 X R_2 X X R_3 X R_4 X R_5 - Y R_6 Y Y R_7 Y R_8 Y R_9 - Z Z R_{10} Z Z Z R_{11} R_{12}$$

where:

XXXXX is a modulo (based on a large prime number) of the date on which authorized use was requested, YYYYY is a modulo (based on a large prime number) of the serial number of the computer on which use of the software is authorized, ZZZZZ is a multiple of the number of days for which use of the software is authorized plus a large prime number, and $R_1$–$R_{12}$ are random numbers;

and where the host-computer generated authorization code would be defined by the vendor to be "substantially similar" to the authorization-unit-generated authorization code if the following conditions are met:

both XXXXX values are identical, the YYYYY values are within one of each other, with consideration for a wrap condition on the modulo function, and the decoded number of days of authorized use, obtained from the authorization unit's ZZZZZ value, is identical to one of the values in a preselected list (e.g., 10, 20, 30, 90, 180, 9999).

FIGS. 5–8 depict from the software user and the software vendor's perspectives the distribution and use of software in accordance with another preferred embodiment of the invention. In this embodiment the unauthorized use of the software is prevented by the use of an authorization code that is based only on information uniquely identifying the one requesting to use the software.

Figure 5:
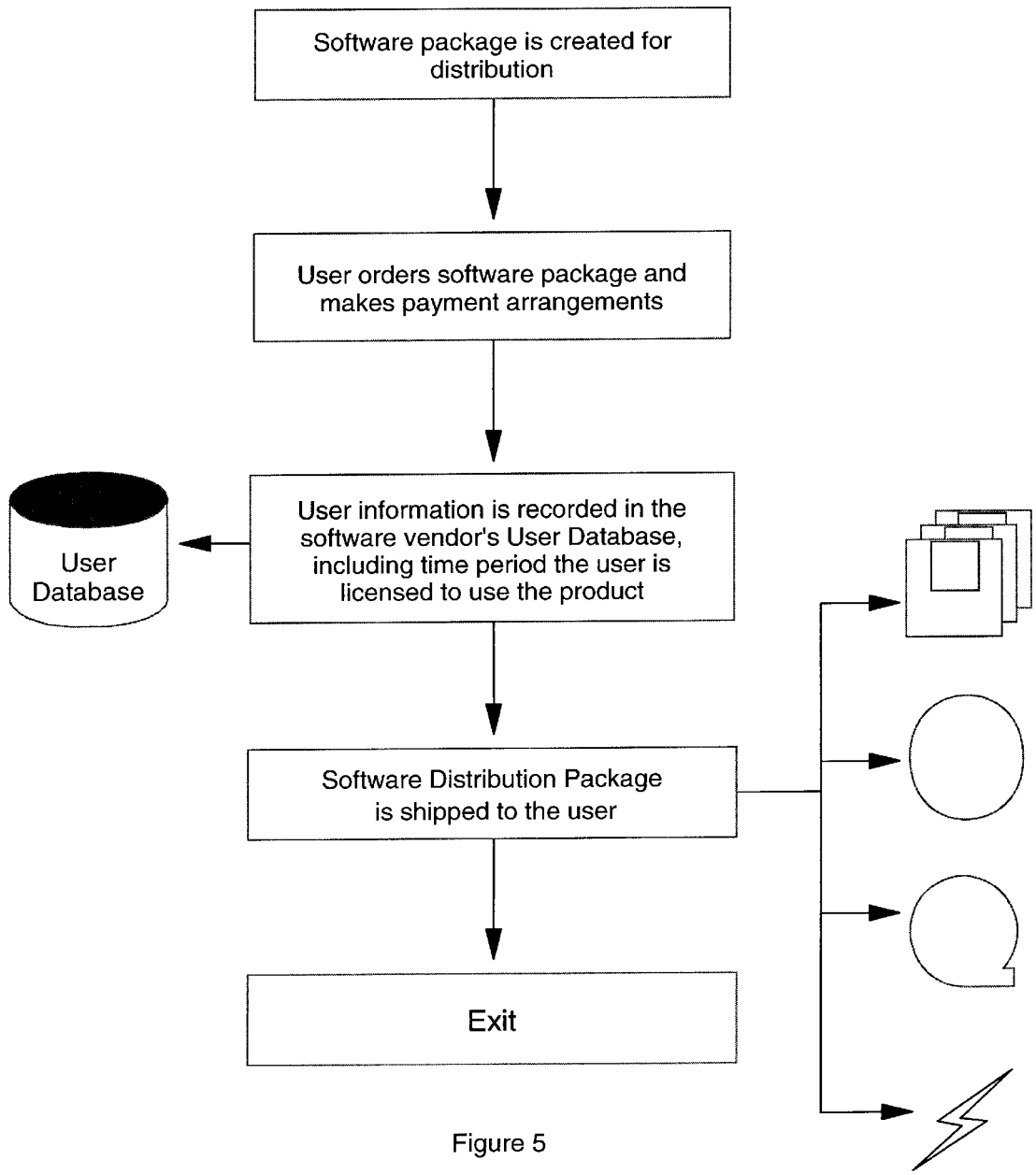

FIG. 5 shows the software vendor's general distribution process with such software.

Figure 8:
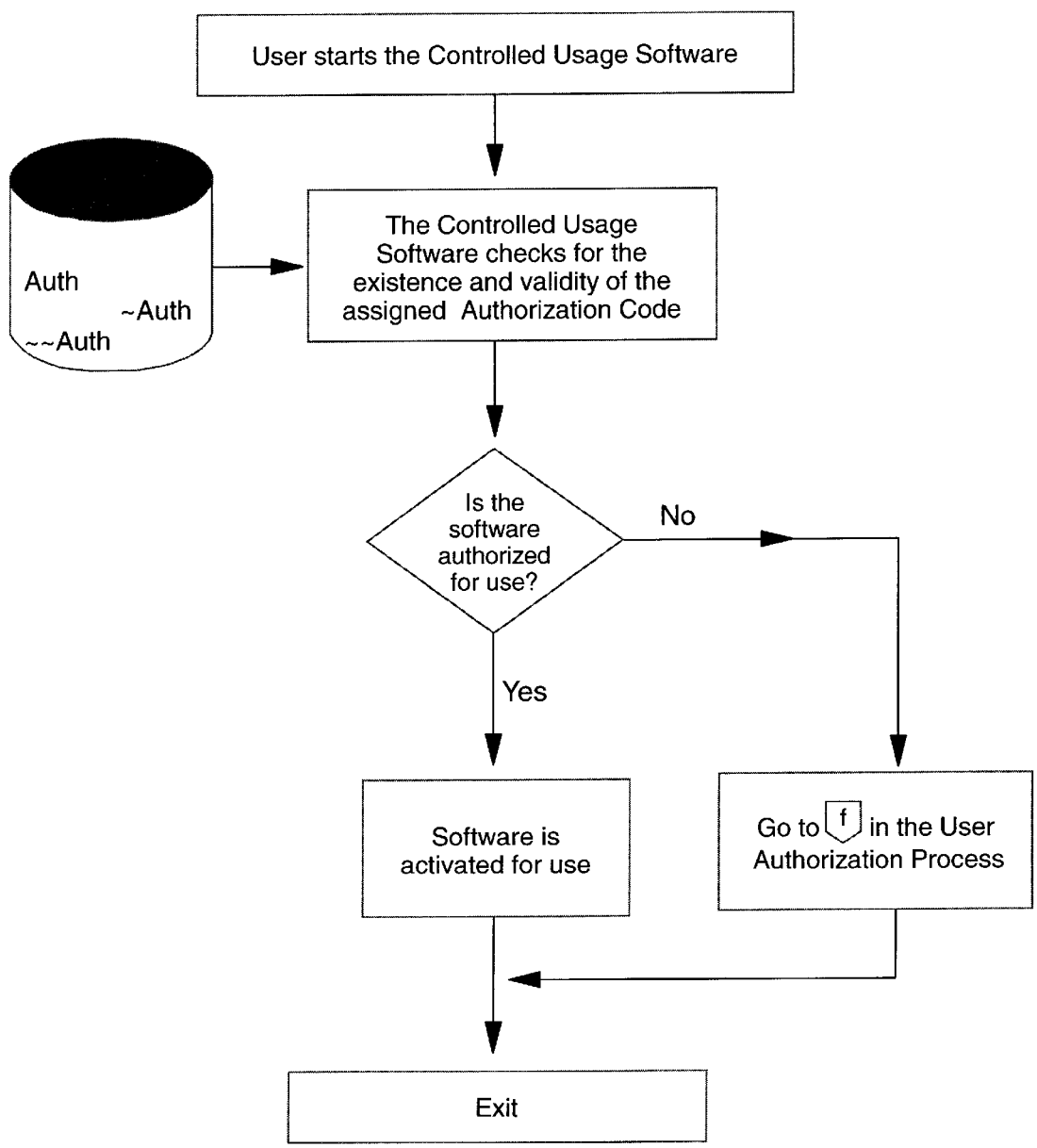
Figure 12:
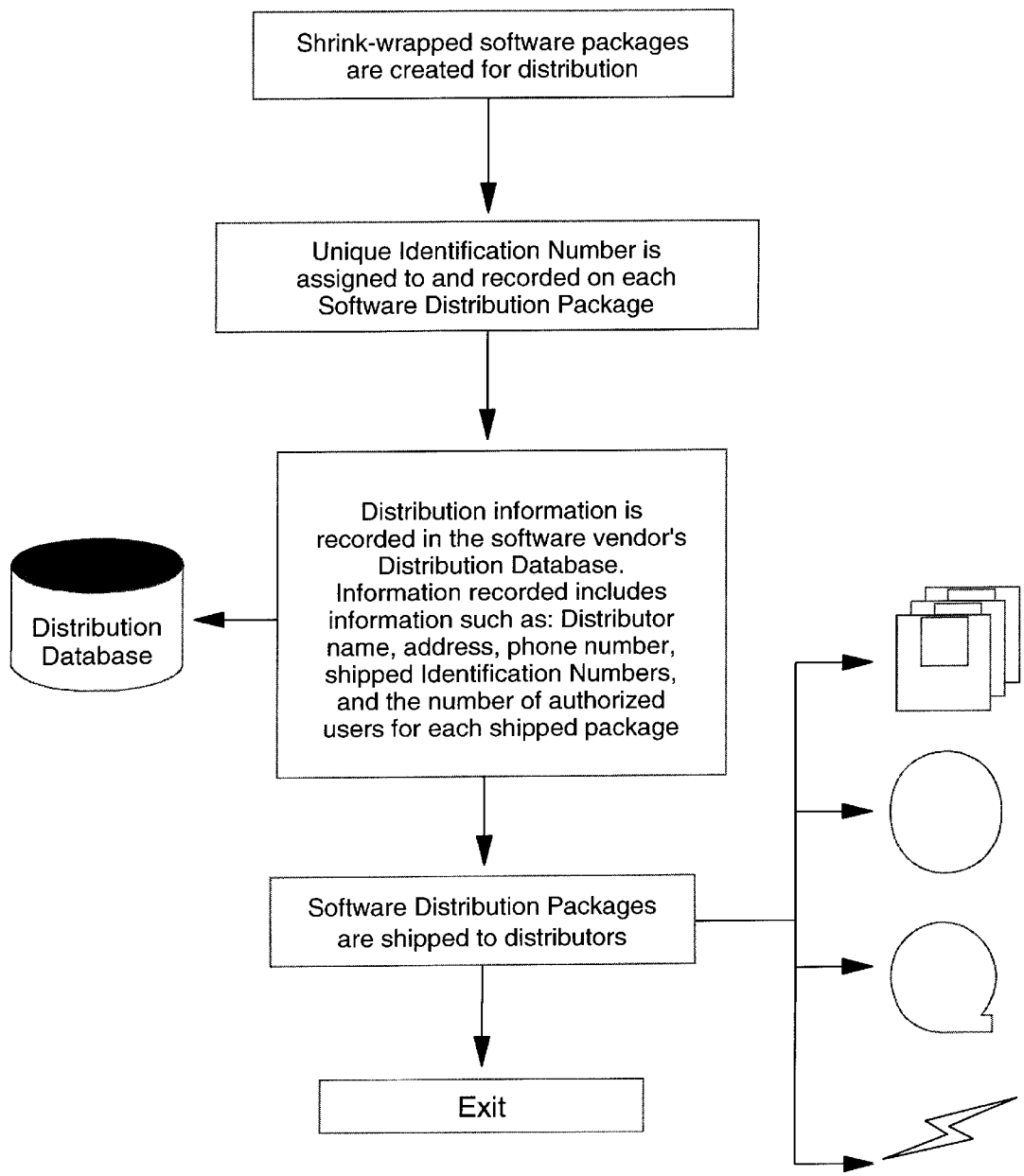
Figure 13:
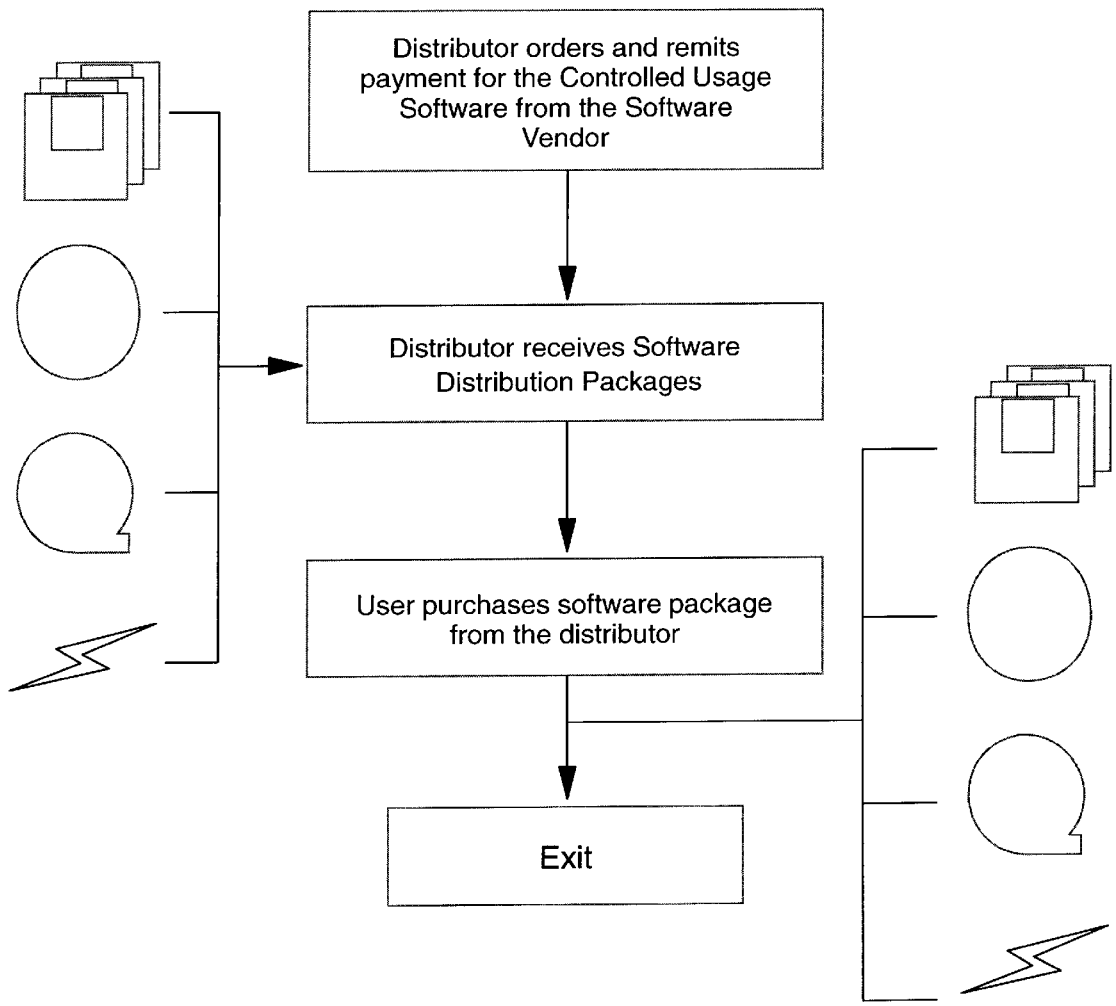
Figure 16:
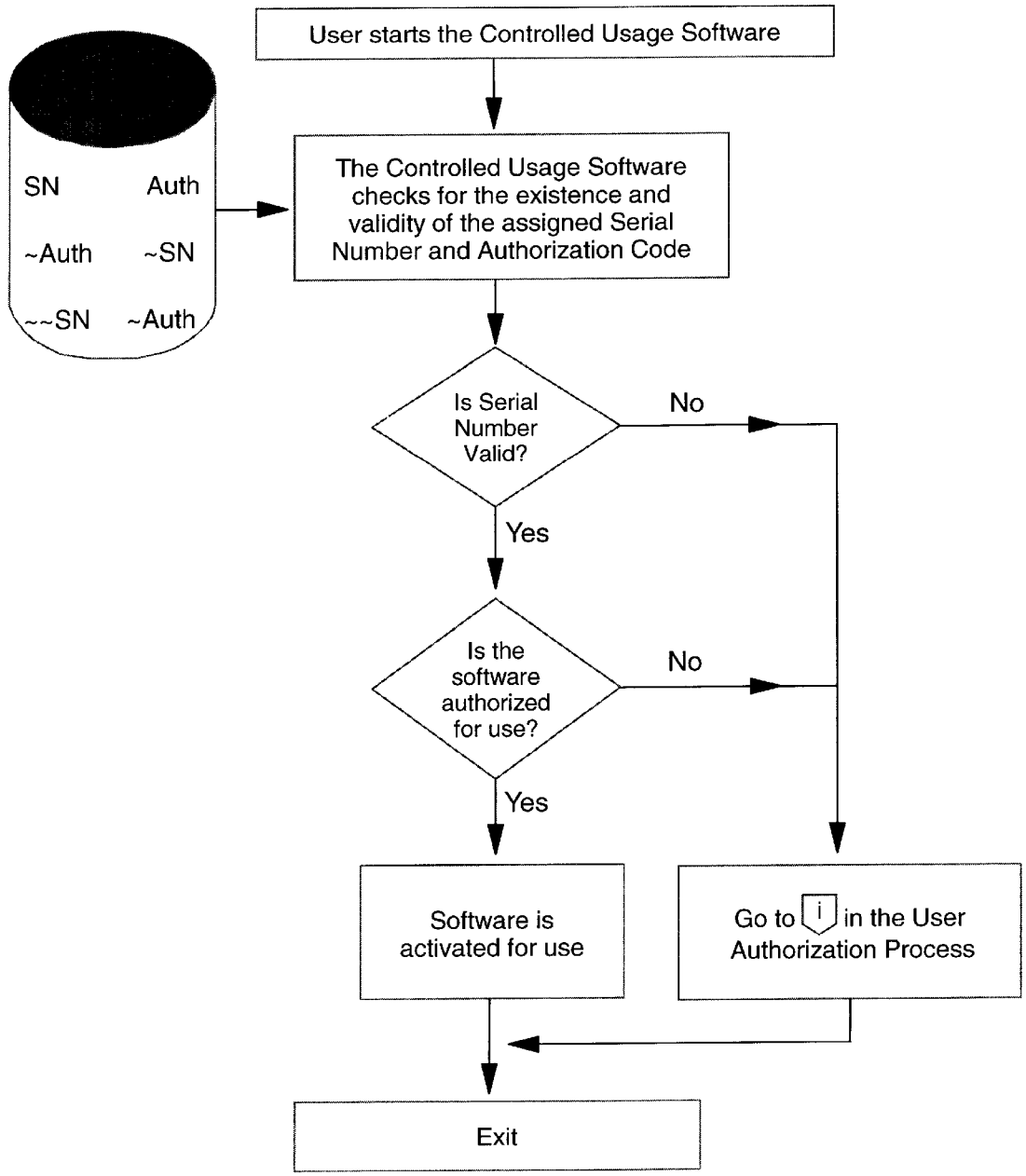

As shown in FIG. 6(a–b) and FIG. 8 from the software user's perspective and in FIG. 7(a–b) from the software vendor's perspective, the method for preventing unauthorized of an embodiment of the invention that uses only the user's information comprises the steps of: (1) establishing a remote authorization unit that authorizes use of the software, wherein said authorization unit includes a stored and maintained database including information such as: information about all authorized users of the software, issued authorization codes, dates on which any previous uses were authorized, duration and extent of authorized uses, wherein it is recognized that the authorization unit could be as simple a software vendor representative maintaining a handwritten notebook and performing any required calculations on a hand calculator, (2) inputting and storing within the host computer information uniquely identifying one requesting to use the software, wherein this information may include such parameters as: the user's name, address, phone number, social security number, bank account number, corporate tax identification number and number of the credit card previously used to purchase a license to use the software, wherein it is understood that this listing of possible parameters is only representative of those that could be chosen, with the listing not meant to be exhaustive, (3) communicating the user information uniquely identifying one requesting to use the software to a remote authorization unit for the purposes of obtaining an authorization code that can be inputted into the host computer to enable use of the software, (4) comparing communicated user information with a database at the authorization unit to verify that one requesting use is an authorized user, (5) generating an authorization code if requester is an authorized user who has not exceed limitations of current licensing agreement, wherein the authorization code is generated by an authorization code algorithm that operates on parameters such as: inputted user information, the date on which the authorization code is being requested, the end-point dates of the period of authorized use, and random numbers that provide uniqueness to the authorization code and prevent one from deciphering the authorization code to ascertain the parameters operated on by said algorithm, wherein it is understood that this listing of possible parameters is only representative of those that could be chosen, with the listing not meant to be exhaustive, (6) communicating the authorization code to one requesting an authorization code, (7) inputting the authorization code into the host computer, (8) storing the authorization code in both clear and encoded form in some nonobvious location in the host computer (e.g., a hidden file in the operating system directory), wherein the storing of the authorization code in this manner allows a check to be made that the authorization code is not later modified, and if it has been modified, the operation of the software can be disabled, (9) using within the host computer same said authorization code algorithm to operate on the host computer stored versions of the same parameters operated upon by the authorization code algorithm at the authorization unit to yield an analogous authorization code, said algorithm being available to the host computer due to authorization code algorithm having been recorded on the storage medium containing the software whose use is requested, (10) comparing the analogous authorization code generated within the host computer with the authorization code received from the authorizatIon unit, (11) enabling the use of the software if analogous authorization code generated within the host computer and the authorization code received from the authorization unit are substantially similar, and (12) updating authorization unit database by associating user information with one or more parameters documenting the issuance of the authorization code, such as: the authorization code, the date on which the authorization code was issued, and the end-point dates of the period of authorized use.

FIGS. 9(a)–9(d) depict from the software user's perspective another preferred embodiment of the invention having hacker protection and using only the user's information and a serial number to protect the software. The method of preventing unauthorized use for such an embodiment is seen to be similar to the method previously described for protecting an embodiment with serial number and identification number protection, but without those portions of the steps pertaining to the use of the identification number, and with the addition of the following steps: (1) using a random number algorithm to set within a predetermined range of values the maximum number of times that one consecutively may input an invalid authorization code into the host computer and have the authorization code algorithm that is encoded on the storage medium operate on host computer stored parameters to yield an analogous authorization code which is to be compared with the inputted authorization code to determine whether they are substantially similar, wherein such substantial similarity is the criteria that must be met in order to enable use of the software, (2) setting an access-attempt counter, that counts the number of consecutive times an invalid authorization code is entered, to zero when the software is initially installed on the host computer, (3) wherein the count of the access-attempt counter is increased by one each time an invalid authorization code is entered, and the access-attempt counter is reset to zero when a valid authorization code is entered, (4) upon the entering of an authorization code, comparing the number within the access-attempt counter with the set maximum number of consecutive times that one may input an invalid authorization code into the host computer, and (5) enabling said authorization code algorithm to operate on the appropriate group of parameters to yield an analogous authorization code if the number within the access-attempt counter is less than or equal to the set maximum number of consecutive times that one may input an invalid authorization code into the host computer.

FIGS. 10–11 depict from the perspective of the user and the software vendor the deauthorization process involved in the transfer of the storage medium containing the software from one computer to another. In this embodiment, the unauthorized use of the software also is prevented by the use of a serial number that uniquely identifies the host computer on which the software is used and the user's uniquely identifying information. For this embodiment, the method is similar to those previously described, except that it includes a deauthorization procedure. The new steps associated with this procedure include: (1) communicating to remote authorization unit information uniquely identifying user seeking to transfer use of the storage medium, (2) comparing said information uniquely identifying user seeking to transfer use of the storage medium, with database at authorization unit of analogous information identifying authorized users of said software to determine whether one seeking to transfer use of the storage medium is an authorized user and whether the inputted information matches the analogous information in the database for said user, wherein the existence of a match authorizes generation of a deauthorization code, (3) generating a deauthorization code if authorized to do so, wherein the deauthorization code is generated by execution of a deauthorization code algorithm which operates on parameters such as: the serial number of host computer system, the most recently received authorization code, the date on which the deauthorization code is being requested, and random numbers to provide uniqueness and prevent deciphering of the deauthorization code algorithm, wherein it is understood that this listing of possible parameters is only representative of those that could be chosen, with the listing not meant to be exhaustive, (4) communicating deauthorization code to one seeking to transfer use of the storage medium, (5) inputting the deauthorization code into the host computer, (6) using within the host computer same deauthorization code algorithm as used at the authorization unit to operate on host computer stored versions of the parameters operated on by the deauthorization code when used at the authorization unit to yield an analogous deauthorization code, this algorithm being available to the host computer due to the deauthorization code algorithm having been recorded on the storage medium containing the software whose storage medium transfer is requested, (7) comparing the analogous deauthorization code generated within the host computer with the deauthorization code received from the authorization unit, (8) disabling the use of the software if analogous deauthorization code generated within the host computer and the deauthorization code received from the authorization unit are substantially similar, (9) erasing the serial number stored in the host computer if analogous deauthorization code generated within the host computer and the deauthorization code received from the authorization unit are substantially similar, (10) upon disabling use of the software, generating an acknowledgment code which verifies that the software has been disabled, wherein the acknowledgment code is generated on the host computer by execution of an acknowledgment code algorithm which operates on parameters such as: the serial number of host computer system, most recently received authorization code, deauthorization code and the date on which the acknowledgment code was generated and random numbers to provide uniqueness and prevent deciphering of the acknowledgment code algorithm, wherein it is understood that this listing of possible parameters is only representative of those that could be chosen, with the listing not meant to be exhaustive, (11) communicating the acknowledgment code to the remote authorization unit, (12) retrieving from the authorization unit database the version of the same parameter operated on by said acknowledgment code algorithm after disabling said software and operating on these parameters with same acknowledgment code algorithm to yield an analogous acknowledgment code, (13) comparing the analogous acknowledgment code generated at the authorization unit with the acknowledgment code received from the user, and (14) updating the user database information so as to indicate that the user is authorized to use said storage medium on another host computer if analogous acknowledgment code generated at the authorization unit and the acknowledgment code received from the user are substantially similar.

FIGS. 12–16 depict from the software user's and the software vendor's perspectives the distribution, sale and use of shrink-wrap software in accordance with a preferred embodiment of the invention. In this embodiment the unauthorized use of the software is prevented by the use of both a serial number which is uniquely associated with the particular host computer on which the software is to be used and an identification number which uniquely identifies each embodiment of the storage medium containing the software.

The method for preventing unauthorized use of this embodiment of the invention is seen to be very similar to that previously described for the method show in FIGS. 1–4, except that with shrink-wrap software the authorization unit includes a distribution database and the user seeking an authorization code is asked for information identifying the distributor from whom the user purchased the software. The distribution database includes parameters such as: distributor name, address, phone number, identification numbers distributed to each distributor, number of authorized users for each shipped embodiment of the storage medium containing the software, wherein it is understood that this listing of possible parameters is only representative of those that could be chosen, with the listing not meant to be exhaustive.

Although the foregoing disclosure relates to preferred embodiments of the invention, it is understood that these details have been given for the purposes of clarification only. Various changes and modifications of the invention will be apparent, to one having ordinary skill in the art, without departing from the spirit and scope of the invention as hereinafter set forth in the claims.

We claim:

1. A method for preventing unauthorized use, on a host computer or other processor based hardware, of a software program recorded within a storage medium, at any time other than during the period for which use has been authorized, comprising the steps of:

inputting and storing within the host computer information uniquely identifying one requesting to use said software program, wherein said information includes at least one from among the group consisting of the user's name, address, phone number, social security number, bank account number, corporate tax identification number and number of the credit card previously used to purchase a license to use said software, communicating said user information to a remote authorization unit for the purposes of obtaining an authorization code that can be inputted to enable use of said software, comparing said communicated user information with a database at the authorization unit of analogous information identifying authorized users of said software to verify that one requesting use of said software is an authorized user, generating an authorization code if one requesting to use said software is an authorized user, wherein said authorization code is generated by an authorization code algorithm that operates on at least one parameter from among the group consisting of said inputted user information, the date on which the authorization code is being requested, and the end-point dates of the period of authorized use, in addition to random numbers that provide uniqueness to the authorization code and prevent one from deciphering the authorization code to ascertain the parameters operated on by said algorithm, communicating said authorization code to one requesting an authorization code, inputting said authorization code into host computer, storing said authorization code within the host computer in both clear and encoded form, using within the host computer same said authorization code algorithm to operate on said stored user information to yield an analogous authorization code, said algorithm being available to the host computer due to authorization code algorithm having been encoded on the storage medium containing the software whose use is requested, comparing said analogous authorization code generated within the host computer with the authorization code received from said authorization unit, enabling the use of said software if analogous authorization code generated within the host computer and the authorization code received from said authorization unit are substantially similar, and updating authorization unit database by associating user's information contained in said database with at least one parameter chosen from the group consisting of said authorization code, the date on which the authorization code is being requested, and the end-point dates of the period of authorized use.

2. A method as recited in claim 1, further comprising the steps of:

generating a serial number uniquely associated with the particular host computer on which the software is to be used, wherein said serial number is generated by execution of a serial number algorithm which operates on input parameters including at least one from among the group consisting of serial numbers of various hardware components on the host computer system, date of serial number's generation, time of serial number's generation and a random number to provide uniqueness and prevent deciphering of the serial number algorithm, wherein with the use of said serial number it is no longer necessary for the user to input and store in the host computer information uniquely identifying one requesting to use said software program, storing said serial number in both its original and an encoded form within the host computer, communicating said serial number along with user information to remote authorization unit, wherein the authorization unit database includes associated serial numbers for the host computers on which the authorized users are using the software, updating authorization unit database by associating said inputted serial number with user's other information contained in said database, wherein said group of parameters on which said authorization code algorithm can operate includes the user's inputted serial number, wherein said authorization code algorithm recorded on the storage medium operates on at least one parameter, from among the group consisting of the inputted and stored user's information, the serial number stored within the host computer, the date of the authorization code's generation and the end-point dates of the period of authorized use, to yield an analogous authorization code, and wherein use of said software is enabled if analogous authorization code generated within the host computer and the authorization code received from said authorization unit are substantially similar.

3. A method as recited in claim 2 that further provides for an authorization procedure to transfer in a controlled manner the use of said storage medium from one host computer to another, wherein said authorization transfer procedure further comprises the steps of:

communicating to remote authorization unit information uniquely identifying user seeking to transfer use of the storage medium, said information selected from the group consisting of information uniquely identifying user, the host computer serial number, and current authorization code expiration date, comparing said information uniquely identifying user seeking to transfer use of the storage medium, with database at authorization unit of analogous information identifying authorized users of said software to determine whether one seeking to transfer use of the storage medium is an authorized user and whether the inputted information matches the analogous information in the database for said user, wherein the existence of a match authorizes generation of a deauthorization code, generating a deauthorization code if authorized to do so, wherein said deauthorization code is generated by execution of a deauthorization code algorithm which operates on parameters including at least one from among the group consisting of the serial number of host computer system, the most recently received authorization code, and the date on which the deauthorization code is being requested, in addition to random numbers to provide uniqueness and prevent deciphering of the deauthorization code algorithm, updating authorization unit database by associating user's information contained in said database with at least one parameter chosen from the group consisting of said deauthorization code, the date on which the deauthorization code is requested, and the phone number of the one requesting a deauthorization code, communicating deauthorization code to one seeking to transfer use of said storage medium, inputting said deauthorization code, using within the host computer same said deauthorization code algorithm to operate on same host computer stored parameters as operated on by the deauthorization code when used at the authorization unit to yield an analogous deauthorization code, said algorithm being available to the host computer due to deauthorization code algorithm having been encoded on the storage medium containing the software whose storage medium transfer is requested, comparing said analogous deauthorization code generated within the host computer with the deauthorization code received from said authorization unit, disabling the use of said software if analogous deauthorization code generated within the host computer and the deauthorization code received from said authorization unit are substantially similar, erasing the serial number stored in the host computer if analogous deauthorization code generated within the host computer and the deauthorization code received from said authorization unit are substantially similar, upon disabling use of the software, generating an acknowledgment code which verifies that the software has been disabled, wherein said acknowledgment code is generated by execution of an acknowledgment code algorithm which operates on parameters including at least one from among the group consisting of the serial number of host computer system, most recently received authorization code, deauthorization code and the date on which the acknowledgment code is generated, in addition to random numbers to provide uniqueness and prevent deciphering of the acknowledgment code algorithm, communicating said acknowledgment code to the remote authorization unit, retrieving from the authorization unit database the version of the same parameter operated on by said acknowledgment code algorithm after disabling said software and operating on said version of parameter with same said acknowledgment code algorithm to yield an analogous acknowledgment code, comparing said analogous acknowledgment code generated at the authorization unit with the acknowledgment code received from the user, and updating said user database information so as to indicate that user is authorized to use said storage medium on another host computer if analogous acknowledgment code generated at the authorization unit and the acknowledgment code received from the user are substantially similar.

4. A method as recited in claim 3 that further provides the means for uniquely identifying each embodiment of the storage medium containing said software, thereby making it possible to individually track each embodiment of the storage medium and to recognize when such an embodiment may have been copied before its installation on a host computer or installed on multiple host computers, wherein said identification means comprises the steps of:

providing each embodiment of the storage medium containing the software program with a unique identification number, wherein said identification number is a member of the groups of parameters selected for operation upon by said serial number and authorization, deauthorization and acknowledgment code algorithms and is associated with user information stored within the authorization unit database, and wherein with the use of said identification number it is no longer necessary for the authorization unit database to contain information uniquely identifying authorized users when one requesting an authorization code initially causes contact to be made with the authorization unit, said user information can now be collected at the first time of contact with the authorization unit.

5. A method as recited in claim 2 that further provides the means for uniquely identifying each embodiment of the storage medium containing said software, thereby making it possible to individually track each embodiment of the storage medium and to recognize when such an embodiment may have been copied before its installation on a host computer or installed on multiple host computers, wherein said identification means comprises the steps of:

providing each embodiment of the storage medium containing the software program with a unique identification number, wherein said identification number is a member of the groups of parameters selected for operation upon by said serial number and authorization code algorithms and is associated with user information stored within the authorization unit database, and wherein with the use of said identification number it is no longer necessary for the authorization unit database to contain information uniquely identifying authorized users when one requesting an authorization code initially causes contact to be made with the authorization unit, said user information can now be collected at the first time of contact with the authorization unit.

6. A method as recited in claim 1 that further provides the means for uniquely identifying each embodiment of the storage medium containing said software, thereby making it possible to individually track each embodiment of the storage medium and to recognize when such an embodiment may have been copied before its installation on a host computer or installed on multiple host computers, wherein said identification means comprises the steps of:

providing each embodiment of the storage medium containing the software program with a unique identification number, wherein said identification number is a member of the groups of parameters selected for operation upon by said authorization code algorithm and is associated with user information stored within the authorization unit database, and wherein with the use of said identification number it is no longer necessary for the authorization unit database to contain information uniquely identifying authorized users when one requesting an authorization code initially causes contact to be made with the authorization unit, said user information can now be collected at the first time of contact with the authorization unit.

7. A method as recited in claim 1 that further provides the means for preventing hackers from inputting an unlimited number of authorization codes in an attempt to enable use of said software, wherein said protection procedure further comprises the steps of:

using a random number algorithm to set within a predetermined range of values the maximum number of times that one consecutively may input an invalid authorization code into the host computer and have said authorization code algorithm that is encoded on the storage medium operate on stored user information to yield an analogous authorization code which is to be compared with the inputted authorization code to determine whether they are substantially similar, wherein such substantial similarity is the criteria that must be met in order to enable use of the software, setting an access-attempt counter, that counts the number of consecutive times an invalid authorization code is entered, to zero when said software is initially installed on the host computer, wherein the count of said access-attempt counter is increased by one each time an invalid authorization code is entered, and the access-attempt counter is reset to zero when a valid authorization code is entered, upon the entering of an authorization code, comparing the number within the access-attempt counter with said set maximum number of consecutive times that one may input an invalid authorization code into the host computer, and enabling said authorization code algorithm to operate on said group of parameters to yield an analogous authorization code if the number within the access-attempt counter is less than or equal to said set maximum number of consecutive times that one may input an invalid authorization code into the host computer.

8. A method as recited in claim 2 that further provides the means for preventing hackers from inputting an unlimited number of authorization codes in an attempt to enable use of said software, wherein said protection procedure further comprises the steps of:

using a random number algorithm to set within a predetermined range of values the maximum number of times that one consecutively may input an invalid authorization code into the host computer and have said authorization code algorithm that is encoded on the storage medium operate on stored user information to yield an analogous authorization code which is to be compared with the inputted authorization code to determine whether they are substantially similar, wherein such substantial similarity is the criteria that must be met in order to enable use of the software, setting an access-attempt counter, that counts the number of consecutive times an invalid authorization code is entered, to zero when said software is initially installed on the host computer, wherein the count of said access-attempt counter is increased by one each time an invalid authorization code is entered, and the access-attempt counter is reset to zero when a valid authorization code is entered, upon the entering of an authorization code, comparing the number within the access-attempt counter with said set maximum number of consecutive times that one may input an invalid authorization code into the host computer, and enabling said authorization code algorithm to operate on said group of parameters to yield an analogous authorization code if the number within the access-attempt counter is less than or equal to said set maximum number of consecutive times that one may input an invalid authorization code into the host computer.

9. A method as recited in claim 3 that further provides the means for preventing hackers from inputting an unlimited number of authorization codes in an attempt to enable use of said software, wherein said protection procedure further comprises the steps of:

using a random number algorithm to set within a predetermined range of values the maximum number of times that one consecutively may input an invalid authorization code into the host computer and have said authorization code algorithm that is encoded on the storage medium operate on stored user information to yield an analogous authorization code which is to be compared with the inputted authorization code to determine whether they are substantially similar, wherein such substantial similarity is the criteria that must be met in order to enable use of the software, setting an access-attempt counter, that counts the number of consecutive times an invalid authorization code is entered, to zero when said software is initially installed on the host computer, p1 wherein the count of said access-attempt counter is increased by one each time an invalid authorization code is entered, and the access-attempt counter is reset to zero when a valid authorization code is entered, upon the entering of an authorization code, comparing the number within the access-attempt counter with said set maximum number of consecutive times that one may input an invalid authorization code into the host computer, and enabling said authorization code algorithm to operate on said group of parameters to yield an analogous authorization code if the number within the access-attempt counter is less than or equal to said set maximum number of consecutive times that one may input an invalid authorization code into the host computer.

10. A method as recited in claim 4 that further provides the means for preventing hackers from inputting an unlimited number of authorization codes in an attempt to enable use of said software, wherein said protection procedure further comprises the steps of:

using a random number algorithm to set within a predetermined range of values the maximum number of times that one consecutively may input an invalid authorization code into the host computer and have said authorization code algorithm that is encoded on the storage medium operate on stored user information to yield an analogous authorization code which is to be compared with the inputted authorization code to determine whether they are substantially similar, wherein such substantial similarity is the criteria that must be met in order to enable use of the software, setting an access-attempt counter, that counts the number of consecutive times an invalid authorization code is entered, to zero when said software is initially installed on the host computer, wherein the count of said access-attempt counter is increased by one each time an invalid authorization code is entered, and the access-attempt counter is reset to zero when a valid authorization code is entered, upon the entering of an authorization code, comparing the number within the access-attempt counter with said set maximum number of consecutive times that one may input an invalid authorization code into the host computer, and enabling said authorization code algorithm to operate on said group of parameters to yield an analogous authorization code if the number within the access-attempt counter is less than or equal to said set maximum number of consecutive times that one may input an invalid authorization code into the host computer.

11. A system for preventing unauthorized use, on a host computer or other processor based hardware, of a software program recorded within a storage medium, at any time other than during the period for which use has been authorized, comprising:

means recorded on the storage medium along with said software program for directing one requesting to use said software to input into the host computer information uniquely identifying one requesting to use said software program, wherein said information includes at least one from among the group consisting of the user's name, address, phone number, social security number, bank account number, corporate tax identification number and number of the credit card previously used to purchase a license to use said software, means recorded on the storage medium for storing within the host computer said user inputted Information, a remote authorization unit that authorizes use of the software, wherein said authorization unit includes a stored and maintained database with information about all authorized users of the software including at least one from among the group consisting of authorized user's name, address, phone number, social security number, bank account number, corporate tax identification number and number of the credit card previously used to purchase a license to use said software, in addition to information regarding date on which any previous use was authorized, duration and extent of authorized use, means recorded on the storage medium for directing one requesting to use said software to communicate said user information to remote authorization unit for the purposes of obtaining an authorization code that can be inputted to enable use of said software, means within the authorization unit for comparing said communicated user information with said authorization unit database of information identifying authorized users of said software to verify that one requesting use of said software is an authorized user, means within authorization unit for generating an authorization code if one requesting to use said software is an authorized user, wherein said authorization code is generated by an authorization code algorithm that operates on at least one parameter from among the group consisting of said inputted user information, the date on which the authorization code is being requested, and the dates of the period of authorized use, in addition to random numbers that provide uniqueness to the authorization code and prevent one from deciphering the authorization code to ascertain the parameters operated on by said algorithm, means recorded on the storage medium for directing one requesting to use said software to input and store said authorization code into host computer, wherein said authorization code is stored in both clear and encoded form, means recorded on storage medium for retrieving stored user information and operating on said information with the same said authorization code algorithm to generate within the host computer an analogous authorization code, means recorded on storage medium for comparing said analogous authorization code generated within the host computer with the authorization code received from said authorization unit, means recorded on the storage medium for enabling the use of said software if analogous authorization code generated within the host computer and the authorization code received from said authorization unit are substantially similar, means recorded on the storage medium for inhibiting use of the software unless an authorization code received from remote authorization unit has been inputted into the host computer and said authorization code is substantially similar to said analogous authorization code generated within the host computer, and means within authorization unit for updating authorization unit database by associating user's information contained in said database with at least one parameter chosen from the group consisting of said authorization code, the date on which the authorization code is being requested, and the end-point dates of the period of authorized use.

12. The system as recited in claim 11, further comprising:

means recorded on the storage medium for generating a serial number uniquely associated with the particular host computer on which the software is to be used, wherein said serial number is generated by execution of a serial number algorithm which operates on input parameters including at least one from among the group consisting of serial numbers of various hardware components on the host computer system, date of serial number's generation, time of serial number's generation and a random number to provide uniqueness and prevent deciphering of the serial number algorithm, wherein with the use of said serial number it is no longer necessary for the system to have a means recorded on the storage medium along with said software program for directing one requesting to use said software to input into the host computer information uniquely identifying one requesting to use said software program, neither is it necessary for the user to input and store said information, means recorded on the storage medium for storing said serial number in both its original and an encoded form within the host computer, means recorded on the storage medium for directing one requesting to use said software to communicate said serial number along with user information to remote authorization unit, wherein the authorization unit database includes associated serial numbers for the host computers on which the authorized users are using the software, means within the authorization unit for updating authorization unit database by associating said inputted serial number with user's other information contained in said database, wherein said group of parameters on which said authorization code algorithm can operate includes the user's inputted serial number, wherein said authorization code algorithm recorded on the storage medium operates on at least one parameter from among the group consisting of the inputted and stored user's information, the serial number stored within the host computer, the date of the authorization code's generation and the end-point dates of the period of authorized use, to yield an analogous authorization code, and wherein use of said software is enabled if analogous authorization code generated within the host computer and the authorization code received from said authorization unit are substantially similar.

13. The system as recited in claim 12 that further provides for an authorization procedure to transfer in a controlled manner the use of said storage medium from one host computer to another, wherein said authorization transfer procedure is provided by said system further comprising:

means recorded on the storage medium for directing one requesting to transfer said storage medium to communicate to remote authorization unit information uniquely identifying user seeking to transfer use of the storage medium, said information selected from the group consisting of information uniquely identifying user, the host computer serial number, and current authorization code expiration date, means within authorization unit for comparing said information uniquely identifying user seeking to transfer use of the storage medium, with database at authorization unit of analogous information identifying authorized users of said software to determine whether one seeking to transfer use of the storage medium is an authorized user and whether the inputted information matches the analogous information in the database for said user, wherein the existence of a match authorizes generation of a deauthorization code, means within the authorization unit for generating a deauthorization code if authorized to do so, wherein said deauthorization code is generated by execution of a deauthorization code algorithm which operates on parameters including at least one from among the group consisting of the serial number of host computer system, most recent authorization code, and the date on which the deauthorization code is being requested, in addition to random numbers to provide uniqueness and prevent deciphering of the deauthorization code algorithm, means within authorization database for updating authorization unit database by associating user's information contained in said database with at least one parameter chosen from the group consisting of said deauthorization code, the date on which the deauthorization code is requested, and the phone number of the one requesting a deauthorization code, means recorded on said storage medium for directing one seeking to transfer said storage medium to input said deauthorization code, means recorded on storage medium for retrieving same host computer stored parameter as operated on by the deauthorization code algorithm when used at the authorization unit and operating on said parameter with said deauthorization code algorithm to yield an analogous deauthorization code, said algorithm being available to the host computer due to deauthorization code algorithm having been recorded on the storage medium containing the software whose storage medium transfer is requested, means recorded on the storage medium for comparing said analogous deauthorization code generated within the host computer with the deauthorization code received from said authorization unit, means recorded on the storage medium for disabling the use of said software if analogous deauthorization code generated within the host computer and the deauthorization code received from said authorization unit are substantially similar, means recorded on the storage medium for erasing the serial number stored in the host computer if analogous deauthorization code generated within the host computer and the deauthorization code received from said authorization unit are substantially similar, means recorded on the storage medium for generating an acknowledgment code which verifies that the software has been disabled, wherein said acknowledgment code is generated by execution of an acknowledgment code algorithm which operates on parameters including at least one from among the group consisting of the serial number of host computer system, the most recently received authorization code, deauthorization code and the date on which the acknowledgment code is generated, in addition to random numbers to provide uniqueness and prevent deciphering of the acknowledgment code algorithm, means recorded on the storage medium for directing one seeking to transfer storage medium to communicate said acknowledgment code to the remote authorization unit, means within the authorization unit for retrieving from the authorization unit database the version of the same parameter operated on by said acknowledgment code algorithm after disabling said software and operating on said version of parameter with same said acknowledgment code algorithm to yield an analogous acknowledgment code, means within the authorization unit for comparing said analogous acknowledgment code generated at the authorization unit with the acknowledgment code received from the user, and means within the authorization unit for updating said user database information so as to indicate that user is authorized to use said storage medium on another host computer if analogous acknowledgment code generated at the authorization unit and the acknowledgment code received from the user are substantially similar.

14. The system as recited in claim 13 that further provides the means for uniquely identifying each embodiment of the storage medium containing said software, thereby making it possible to individually track each embodiment of the storage medium and to recognize when such an embodiment may have been copied before its installation on a host computer or installed on multiple host computers, wherein said identification means comprises:

means for providing each embodiment of the storage medium containing the software program with a unique identification number, wherein said identification number is a member of the groups of parameters selected for operation upon by said serial number, authorization, deauthorization and acknowledgment code algorithms and is associated with user information stored within the authorization unit database, and wherein with the use of said identification number it is no longer necessary for the authorization unit database to contain information uniquely identifying authorized users when one requesting an authorization code initially causes contact to be made with the authorization unit, said user information can now be collected at the first time of contact with the authorization unit.

15. The system as recited in claim 12 that further provides the means for uniquely identifying each embodiment of the storage medium containing said software, thereby making it possible to individually track each embodiment of the storage medium and to recognize when such an embodiment may have been copied before its installation on a host computer or installed on multiple host computers, wherein said identification means comprises:

means for providing each embodiment of the storage medium containing the software program with a unique identification number, wherein said identification number is a member of the groups of parameters selected for operation upon by said serial number and authorization code algorithms and is associated with user information stored within the authorization unit database, and wherein with the use of said identification number it is no longer necessary for the authorization unit database to contain information uniquely identifying authorized users when one requesting an authorization code initially causes contact to be made with the authorization unit, said user information can now be collected at the first time of contact with the authorization unit.

16. The system as recited in claim 11 that further provides the means for uniquely identifying each embodiment of the storage medium containing said software, thereby making it possible to individually track each embodiment of the storage medium and to recognize when such an embodiment may have been copied before its installation on a host computer or installed on multiple host computers, wherein said identification means comprises:

means for providing each embodiment of the storage medium containing the software program with a unique identification number, wherein said identification number is a member of the groups of parameters selected for operation upon by said authorization code algorithm and is associated with user information stored within the authorization unit database, and wherein with the use of said identification number it is no longer necessary for the authorization unit database to contain information uniquely identifying authorized users when one requesting an authorization code initially causes contact to be made with the authorization unit, said user information can now be collected at the first time of contact with the authorization unit.

17. The system as recited in claim 11 that further provides the means for preventing hackers from inputting an unlimited number of invalid authorization codes in an attempt to enable use of said software, wherein said means for providing said additional protection comprises:

means recorded on the storage medium for using a random number algorithm to set within a predetermined range of values the maximum number of times that one consecutively may input an invalid authorization code into the host computer and have said authorization code algorithm, that is encoded on the storage medium, operate on stored user information to yield an analogous authorization code which is to be compared with the inputted authorization code to determine whether they are substantially similar, wherein such substantial similarity is the criteria that must be met in order to enable use of the software, means recorded on the storage medium for establishing an access-attempt counter, that counts the number of consecutive times an invalid authorization code is entered, wherein said access counter is set to zero when said software is initially installed on the host computer, wherein the count of said access-attempt counter is increased by one each time an invalid authorization code is entered, and the access-attempt counter is reset to zero when a valid authorization code is entered, means recorded on the storage medium for comparing, upon the entry of an authorization code, the number within the access-attempt counter with said set maximum number of consecutive times that one may input an invalid authorization code into the host computer, and means recorded on the storage medium for enabling said authorization code algorithm to operate on said group of parameters to yield an analogous authorization code if and only if the number within the access-attempt counter is less than or equal to said set maximum number of consecutive times that one may input an invalid authorization code into the host computer.

18. The system as recited in claim 12 that further provides the means for preventing hackers from inputting an unlimited number of invalid authorization codes in an attempt to enable use of said software, wherein said means for providing said additional protection comprises:

means recorded on the storage medium for using a random number algorithm to set within a predetermined range of values the maximum number of times that one consecutively may input an invalid authorization code into the host computer and have said authorization code algorithm that is encoded on the storage medium operate on stored user information to yield an analogous authorization code which is to be compared with the inputted authorization code to determine whether they are substantially similar, wherein such substantial similarity is the criteria that must be met in order to enable use of the software, means recorded on the storage medium for establishing an access-attempt counter, that counts the number of consecutive times an invalid authorization code is entered, wherein said access counter is set to zero when said software is initially installed on the host computer, wherein the count of said access-attempt counter is increased by one each time an invalid authorization code is entered, and the access-attempt counter is reset to zero when a valid authorization code is entered, means recorded on the storage medium for comparing, upon the entry of an authorization code, the number within the access-attempt counter with said set maximum number of consecutive times that one may input an invalid authorization code into the host computer, and means recorded on the storage medium for enabling said authorization code algorithm to operate on said group of parameters to yield an analogous authorization code if and only if the number within the access-attempt counter is less than or equal to said set maximum number of consecutive times that one may input an invalid authorization code into the host computer.

19. The system as recited in claim 13 that further provides the means for preventing hackers from inputting an unlimited number of invalid authorization codes in an attempt to enable use of said software, wherein said means for providing said additional protection comprises:

means recorded on the storage medium for using a random number algorithm to set within a predetermined range of values the maximum number of times that one consecutively may input an invalid authorization code into the host computer and have said authorization code algorithm that is encoded on the storage medium operate on stored user information to yield an analogous authorization code which is to be compared with the inputted authorization code to determine whether they are substantially similar, wherein such substantial similarity is the criteria that must be met in order to enable use of the software, means recorded on the storage medium for establishing an access-attempt counter, that counts the number of consecutive times an invalid authorization code is entered, wherein said access counter is set to zero when said software is initially installed on the host computer, wherein the count of said access-attempt counter is increased by one each time an invalid authorization code is entered, and the access-attempt counter is reset to zero when a valid authorization code is entered, means recorded on the storage medium for comparing, upon the entry of an authorization code, the number within the access-attempt counter with said set maximum number of consecutive times that one may input an invalid authorization code into the host computer, and means recorded on the storage medium for enabling said authorization code algorithm to operate on said group of parameters to yield an analogous authorization code if and only if the number within the access-attempt counter is less than or equal to said set maximum number of consecutive times that one may input an invalid authorization code into the host computer.

20. The system as recited in claim 14 that further provides the means for preventing hackers from inputting an unlimited number of invalid authorization codes in an attempt to enable use of said software, wherein said means for providing said additional protection comprises:

means recorded on the storage medium for using a random number algorithm to set within a predetermined range of values the maximum number of times that one consecutively may input an invalid authorization code into the host computer and have said authorization code algorithm that is encoded on the storage medium operate on stored user information to yield an analogous authorization code which is to be compared with the inputted authorization code to determine whether they are substantially similar, wherein such substantial similarity is the criteria that must be met in order to enable use of the software, means recorded on the storage medium for establishing an access-attempt counter, that counts the number of consecutive times an invalid authorization code is entered, wherein said access counter is set to zero when said software is initially installed on the host computer, wherein the count of said access-attempt counter is increased by one each time an invalid authorization code is entered, and the access-attempt counter is reset to zero when a valid authorization code is entered, means recorded on the storage medium for comparing, upon the entry of an authorization code, the number within the access-attempt counter with said set maximum number of consecutive times that one may input an invalid authorization code into the host computer, and means recorded on the storage medium for enabling said authorization code algorithm to operate on said group of parameters to yield an analogous authorization code if and only if the number within the access-attempt counter is less than or equal to said set maximum number of consecutive times that one may input an invalid authorization code into the host computer.

* * * * *